(12) United States Patent
Lin et al.

(10) Patent No.: US 10,310,228 B2
(45) Date of Patent: *Jun. 4, 2019

(54) OPTICAL LENS, IMAGE CAPTURING DEVICE AND ELECTRONIC DEVICE

(71) Applicant: LARGAN PRECISION CO., LTD., Taichung (TW)

(72) Inventors: Cheng-Chen Lin, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/700,221

(22) Filed: Sep. 11, 2017

(65) Prior Publication Data

US 2018/0011299 A1    Jan. 11, 2018

Related U.S. Application Data

(63) Continuation of application No. 14/800,927, filed on Jul. 16, 2015, now Pat. No. 9,791,670.

(30) Foreign Application Priority Data

Apr. 2, 2015   (TW) .............................. 104110961 A

(51) Int. Cl.
   *G02B 13/18*      (2006.01)
   *G02B 3/02*       (2006.01)
   (Continued)

(52) U.S. Cl.
   CPC ........... *G02B 13/0045* (2013.01); *G02B 9/62* (2013.01)

(58) Field of Classification Search
   CPC ...... G02B 13/0045; G02B 9/62; G02B 13/18; G02B 13/04; G02B 13/16; G02B 7/028
   See application file for complete search history.

(56) References Cited

U.S. PATENT DOCUMENTS 6,867,933 B2    3/2005   Matsusaka
8,335,043 B2   12/2012   Huang
(Continued)

FOREIGN PATENT DOCUMENTS

CN    104330868 A    2/2015
CN    104330869 A    2/2015
(Continued)

*Primary Examiner* — Alicia M Harrington
(74) *Attorney, Agent, or Firm* — McClure, Qualey & Rodack, LLP

(57) ABSTRACT

An optical lens includes, in order from an object side to an image side, a first lens element, a second lens element, a third lens element, a fourth lens element, a fifth lens element and a sixth lens element. The first lens element with negative refractive power has an image-side surface being concave in a paraxial region thereof. The second lens element has refractive power. The third lens element has positive refractive power. The fourth lens element with positive refractive power has an image-side surface being convex in a paraxial region thereof. The fifth lens element with negative refractive power has an image-side surface being concave in a paraxial region thereof and including one convex shape in an off-axis region thereof. The sixth lens element with refractive power has an image-side surface being concave in a paraxial region thereof and including one convex shape in an off-axis region thereof.

18 Claims, 18 Drawing Sheets

(51) Int. Cl.
G02B 13/00 (2006.01)
G02B 9/62 (2006.01)

(56) References Cited

U.S. PATENT DOCUMENTS

| | | |
|---|---|---|
| 2012/0206822 A1 | 8/2012 | Hsieh et al. |
| 2014/0029115 A1 | 1/2014 | Liao et al. |
| 2016/0109687 A1* | 4/2016 | Son .................... G02B 13/0045 348/294 |
| 2016/0124185 A1 | 5/2016 | Tang et al. |

FOREIGN PATENT DOCUMENTS

| | | |
|---|---|---|
| CN | 104330879 A | 2/2015 |
| CN | 104330880 A | 2/2015 |
| JP | 2014-010400 A | 1/2014 |
| JP | 2014-010401 A | 1/2014 |
| TW | 201418765 A | 5/2014 |
| TW | 201423145 A | 6/2014 |

\* cited by examiner

OPTICAL LENS, IMAGE CAPTURING DEVICE AND ELECTRONIC DEVICE

RELATED APPLICATIONS

This application is a continuation of U.S. application Ser. No. 14/800,927, filed on Jul. 16, 2015, now U.S. Pat. No. 9,791,670, which claims priority to Taiwan Application Serial Number 104110961, filed on Apr. 2, 2015, the entirety of which is incorporated by reference herein.

BACKGROUND

Technical Field

The present disclosure relates to an optical lens and an image capturing device. More particularly, the present disclosure relates to a compact optical lens and image capturing device applicable to electronic devices.

Description of Related Art

In recent years, with the popularity of mobile terminals having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a four-element lens structure or a five-element lens structure. Due to the popularity of mobile terminals with high-end specifications, such as smart phones, tablet personal computers and wearable apparatus, the requirements for high resolution and image quality of present compact optical systems increase significantly. However, the conventional optical systems cannot satisfy these requirements of the compact optical systems.

Other conventional compact optical systems with six-element lens structure enhance image quality and resolution. However, the arrangement of the lens elements thereof cannot provide both of the characteristics of the wide field of view and the compact size for obtain the proper aberration and relative illumination, thus the image quality thereof cannot be improved.

SUMMARY

According to one aspect of the present disclosure, an optical lens includes, in order from an object side to an image side, a first lens element, a second lens element, a third lens element, a fourth lens element, a fifth lens element and a sixth lens element. The first lens element with negative refractive power has an image-side surface being concave in a paraxial region thereof. The second lens element has refractive power. The third lens element has positive refractive power. The fourth lens element with positive refractive power has an image-side surface being convex in a paraxial region thereof, wherein an object-side surface and the image-side surface of the fourth lens element are aspheric. The fifth lens element with negative refractive power has an image-side surface being concave in a paraxial region thereof, wherein the image-side surface of the fifth lens element includes at least one convex shape in an off-axis region thereof, and an object-side surface and the image-side surface of the fifth lens element are aspheric. The sixth lens element with refractive power has an image-side surface being concave in a paraxial region thereof, wherein the image-side surface of the sixth lens element includes at least one convex shape in an off-axis region thereof, and an object-side surface and the image-side surface of the sixth lens element are aspheric. The optical lens has a total of six lens elements with refractive power, there is an air space between every two lens elements of the first lens element, the second lens element, the third lens element, the fourth lens element, the fifth lens element and the sixth lens element that are adjacent to each other. When a focal length of the first lens element is f1, a focal length of the second lens element is f2, an axial distance between the first lens element and the second lens element is T12, and an axial distance between the second lens element and the third lens element is T23, the following conditions are satisfied:

$-0.20 < |f1|/f2 < 1.50$; and $1.0 < T12/T23$.

According to another aspect of the present disclosure, an image capturing device includes the optical lens according to the aforementioned aspect and an image sensor, wherein the image sensor is disposed on an image surface of the optical lens.

According to further another aspect of the present disclosure, an electronic device includes the image capturing device according to the aforementioned aspect.

According to yet another aspect of the present disclosure, an optical lens includes, in order from an object side to an image side, a first lens element, a second lens element, a third lens element, a fourth lens element, a fifth lens element and a sixth lens element. The first lens element with negative refractive power has an image-side surface being concave in a paraxial region thereof. The second lens element has refractive power. The third lens element has positive refractive power. The fourth lens element with positive refractive power has an image-side surface being convex in a paraxial region thereof, wherein an object-side surface and the image-side surface of the fourth lens element are aspheric. The fifth lens element with negative refractive power has an image-side surface being concave in a paraxial region thereof, wherein an object-side surface and the image-side surface of the fifth lens element are aspheric. The sixth lens element with positive refractive power has an object-side surface being convex in a paraxial region thereof and an image-side surface being concave in a paraxial region thereof, wherein the image-side surface of the sixth lens element includes at least one convex shape in an off-axis region thereof, and the object-side surface and the image-side surface of the sixth lens element are aspheric. The optical lens has a total of six lens elements with refractive power, there is an air space between every two lens elements of the first lens element, the second lens element, the third lens element, the fourth lens element, the fifth lens element and the sixth lens element that are adjacent to each other. When a focal length of the first lens element is f1, a focal length of the second lens element is f2, a focal length of the fourth lens element is f4, and a focal length of the sixth lens element is f6, the following conditions are satisfied:

$-1.50 < |f1|/f2 < 4.0$; and $0 < f6/f4 < 4.0$.

According to still another aspect of the present disclosure, an image capturing device includes the optical lens according to the aforementioned aspect and an image sensor, wherein the image sensor is disposed on an image surface of the optical lens.

According to further another aspect of the present disclosure, an electronic device includes the image capturing device according to the aforementioned aspect.

DETAILED DESCRIPTION

Figure 1:
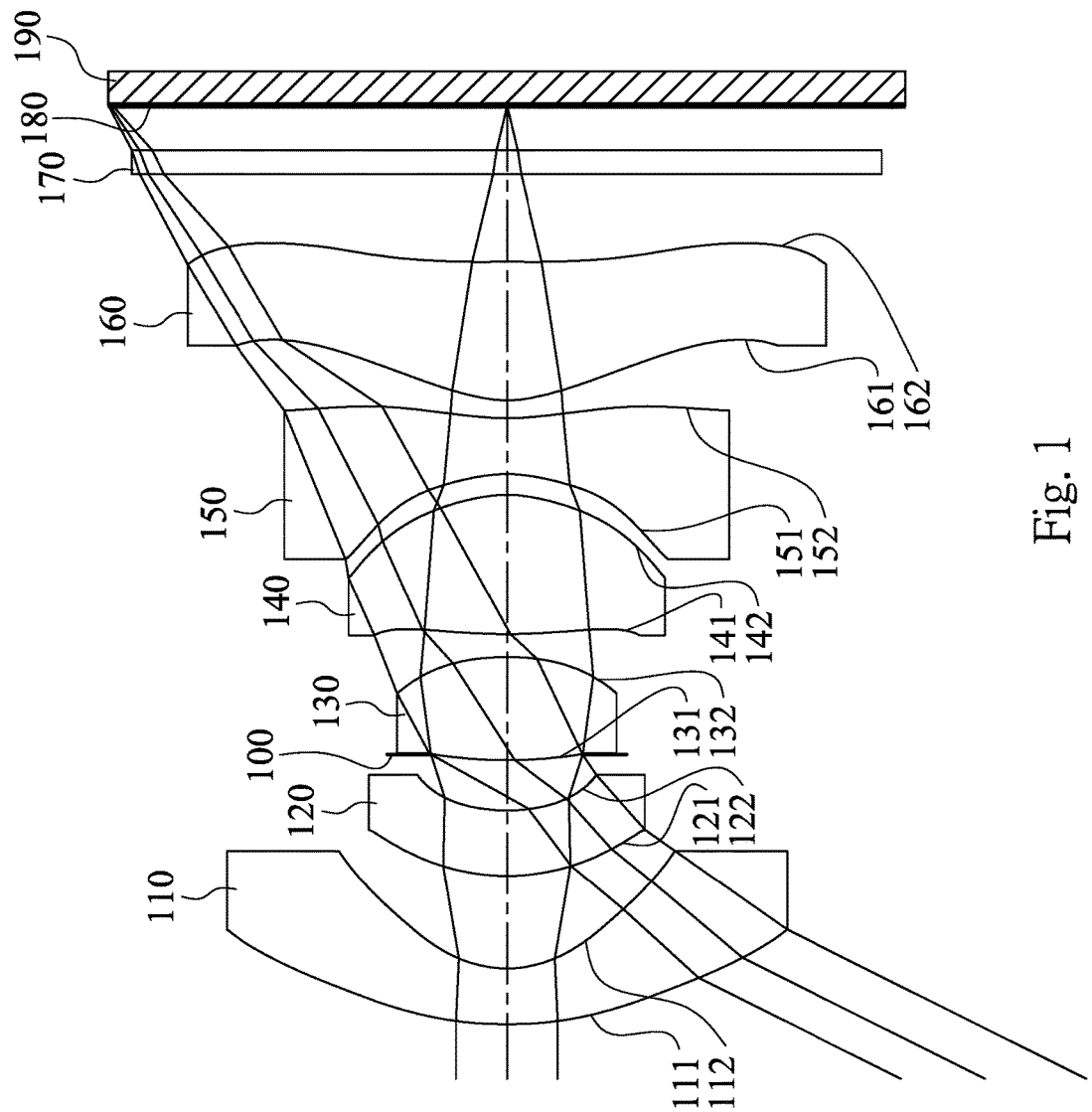
FIG. 1 is a schematic view of an image capturing device according to the 1st embodiment of the present disclosure.

An optical lens includes, in order from an object side to an image side, a first lens element, a second lens element, a third lens element, a fourth lens element, a fifth lens element and a sixth lens element, wherein the optical lens has a total of six lens elements with refractive power.

There is an air space between every two lens elements of the first lens element, the second lens element, the third lens element, the fourth lens element, the fifth lens element and the sixth lens element that are adjacent to each other. That is, each of the first through sixth lens elements is a single and non-cemented lens element, and every two lens elements adjacent to each other are not cemented. Moreover, the manufacturing process of the cemented lenses is more complex than the non-cemented lenses. In other words, of the first lens element, the second lens element, the third lens element, the fourth lens element, the fifth lens element and the sixth lens element of the optical lens, there is a space in a paraxial region between every pair of lens elements that are adjacent to each other. In particular, a second surface of one lens element and a first surface of the following lens element need to have accurate curvature to ensure these two lens elements will be highly cemented. However, during the cementing process, those two lens elements might not be highly cemented due to displacement and it is thereby not favorable for the image quality of the optical lens. Therefore, according to the optical lens of the present disclosure, an air space in a paraxial region between every two of the first lens element, the second lens element, the third lens element, the fourth lens element, the fifth lens element and the sixth lens element that are adjacent to each other of the present disclosure improves the problem generated by the cemented lens elements.

The first lens element with negative refractive power has an image-side surface being concave in a paraxial region thereof. Therefore, the field of view can be increased effectively so as to enlarge the range captured by the optical lens.

The second lens element can have positive refractive power, and can have an object-side surface being convex in a paraxial region thereof and an image-side surface being concave in a paraxial region thereof. Therefore, the astigmatism of the optical lens can be corrected for enhancing the image quality, and the total track length of the optical lens can be reduced.

The third lens element can have positive refractive power, so that the total track length of the optical lens can be further reduced so as to maintain the compact size thereof.

The fourth lens element with positive refractive power can have an object-side surface being convex in a paraxial region thereof and including at least one concave shape in an off-axis region thereof, and has an image-side surface being convex in a paraxial region thereof. Therefore, the sensitivity of refractive power distribution of the optical lens can be reduced, and the incident angle of the off-axis field onto the image sensor can be reduced so as to increase the response efficiency of the image sensor.

The fifth lens element with negative refractive power has an image-side surface being concave in a paraxial region thereof, wherein the image-side surface of the fifth lens element can include at least one convex shape in an off-axis region thereof. Therefore, the aberration in a paraxial region and an off-axis region of the optical lens can be corrected for enhancing the image quality.

The sixth lens element can have positive refractive power and an object-side surface being convex in a paraxial region thereof, and has an image-side surface being concave in a paraxial region thereof and including at least one convex shape in an off-axis region thereof. Therefore, the principal point can be positioned away from the image surface of the optical lens so as to reduce the back focal length for keeping a compact size. Further, it is also favorable for correcting the aberration of the off-axis region so as to enhance the image quality.

When a focal length of the first lens element is f1, and a focal length of the second lens element is f2, the following condition is satisfied: $-1.50<|f1|/f2<4.0$. Therefore, it is favorable for reducing the sensitivity of the surface accuracy of the first lens element and the second lens element by properly adjusting the distribution of the refractive power of the first lens element and the second lens element, and it is also favorable for manufacturing the optical lens by enlarging the field of view. Preferably, the following condition can be satisfied: $-0.70<|f1|/f2<1.80$. More preferably, the following condition can be satisfied: $-0.20<|f1|/f2<1.50$. Further preferably, the following condition can be satisfied: $-0.20<|f1|/f2<1.0$.

When an axial distance between the first lens element and the second lens element is T12, and an axial distance between the second lens element and the third lens element is T23, the following condition is satisfied: $1.0<T12/T23$. Therefore, the sufficient space between the first lens element and the second lens element can be provided so as to avoid the collision between the first lens element and the second lens element or the second lens element and the third lens element during assembling, and the wide field of view and compact size of the optical lens can be also achieved while providing high image quality thereof. Preferably, the following condition can be satisfied: $1.40<T12/T23$.

When a focal length of the fourth lens element is f4, and a focal length of the sixth lens element is f6, the following condition is satisfied: $0<f6/f4<4.0$. Therefore, the total track length of the optical lens can be reduced so as to maintain the compact size thereof.

When half of the maximal field of view of the optical lens is HFOV, and an axial distance between an object-side surface of the first lens element and the image surface is TL, the following conditions are satisfied: $1.30<\tan(HFOV)$; and $TL/\sin(HFOV\times1.6)<7.0$ mm. Therefore, the characteristics of large field of view and short total track length of the optical lens can be provided so as to maintain the compact size thereof.

When the axial distance between the first lens element and the second lens element is T12, an axial distance between the third lens element and the fourth lens element is T34, an axial distance between the fourth lens element and the fifth lens element is T45, and an axial distance between the fifth lens element and the sixth lens element is T56, the following condition is satisfied: $1.25<T12/(T34+T45+T56)<4.0$. Therefore, the lens elements between the stop and the image surface can be arranged closely, and the additional element, such as a spacer which is disposed between two lens elements with excessive distance can be omitted.

When a central thickness of the first lens element is CT1, a central thickness of the second lens element is CT2, a central thickness of the third lens element is CT3, a central thickness of the fourth lens element is CT4, and a central thickness of the sixth lens element is CT6, the following conditions are satisfied: $CT1<CT2$; $CT1<CT3$; $CT1<CT4$; and $CT1<CT6$. Therefore, it is favorable for the manufacturing and assembling of the lens elements so as to obtain the high image quality.

When a focal length of the optical lens is f, and a curvature radius of the object-side surface of the sixth lens element is R11, the following condition is to satisfied: $0<R11/f<1.40$. Therefore, it is favorable for obtaining high image quality by correcting the aberration generated from the fifth lens element. Preferably, the following condition can be satisfied: $0<R11/f<1.0$.

When a central thickness of the fifth lens element is CT5, and a distance in parallel with an optical axis from an axial vertex on the image-side surface of the fifth lens element to a maximum effective diameter position on the image-side surface of the fifth lens element is Sag52 (Sag52 is a positive value with the distance in parallel with the optical axis towards the image side; Sag52 is a negative value with the distance in parallel with the optical axis towards the object side), and the following condition is satisfied: $4.0<CT5/|Sag52|$. Therefore, the shape of the lens element is proper for manufacturing and forming thereof, and the defective forming can be reduced.

When a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, and a maximum of N1, N2, N3, N4, N5 and N6 is Nmax, the following condition is satisfied: $1.60<Nmax<1.70$. Therefore, it is favorable for reducing the aberration by the proper material of the lens elements.

When the focal length of the first lens element is f1, the focal length of the second lens element is f2, a focal length of the third lens element is f3, the focal length of the fourth lens element is f4, a focal length of the fifth lens element is f5, and the focal length of the sixth lens element is f6, the following conditions are satisfied: $|f5|<|f1|$; $|f5|<|f2|$; $|f5|<|f3|$; $|f5|<|f4|$; and $|f5|<|f6|$. Therefore, it is favorable for correcting the aberration by the proper distribution of the refractive power of the optical lens.

According to the optical lens of the present disclosure, the lens elements thereof can be made of glass or plastic material. When the lens elements are made of glass material, the distribution of the refractive powers of the optical lens may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the optical lens can also be reduced.

According to the optical lens of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof.

According to the optical lens of the present disclosure, the positive refractive power or the negative refractive power of a lens element or the focal length of the lens element, that is, refers to the refractive power or the focal length in a paraxial region of the lens element.

According to the optical lens of the present disclosure, the optical lens can include at least one stop, such as an aperture stop, a glare stop or a field stop. Said glare stop or said field stop is for eliminating the stray light and thereby improving the image resolution thereof.

According to the optical lens of the present disclosure, an image surface of the optical lens, based on the corresponding image sensor, can be flat or curved. In particular, the image surface can be a curved surface being concave facing towards the object side.

According to the optical lens of the present disclosure, an aperture stop can be configured as a front stop or a middle stop. A front stop disposed between an object and the first lens element can provide a longer distance between an exit pupil of the optical lens and the image surface and thereby improves the image-sensing efficiency of an image sensor. A middle stop disposed between the first lens element and the image surface is favorable for enlarging the field of view of the optical lens and thereby provides a wider field of view for the same.

According to the optical lens of the present disclosure, the optical lens can be applied to 3D (three-dimensional) image capturing applications, in products such as digital cameras, mobile devices, digital tablets, smart TV, internet monitoring device, motion sensing input device, vehicle device (such as driving recording systems, vehicle reversing displays), rear view camera systems, and wearable devices.

According to the present disclosure, an image capturing device is provided. The image capturing device includes the aforementioned optical lens and an image sensor, wherein the image sensor is disposed on the image side of the aforementioned optical lens, that is, the image sensor can be disposed on or near an image surface of the aforementioned optical lens. In the image capturing device with the arrangement of the aforementioned optical lens, the wide field of view and the compact size thereof can be obtained with the proper distribution of the aberration and relative illumination, and the proper arrangement of the shape of the lens element can be obtained easily. Preferably, the image capturing device can further include a barrel member, a holding member or a combination thereof.

According to the present disclosure, an electronic device is provided. The electronic device includes the aforementioned image capturing device. Therefore, the image quality of the electronic device can be increased. Preferably, the electronic device can further include but not limited to a control unit, a display, a storage unit, a random access memory unit (RAM), a read only memory unit (ROM) or a combination thereof.

According to the above description of the present disclosure, the following 1st-10th specific embodiments are provided for further explanation.

1st Embodiment

Figure 2:
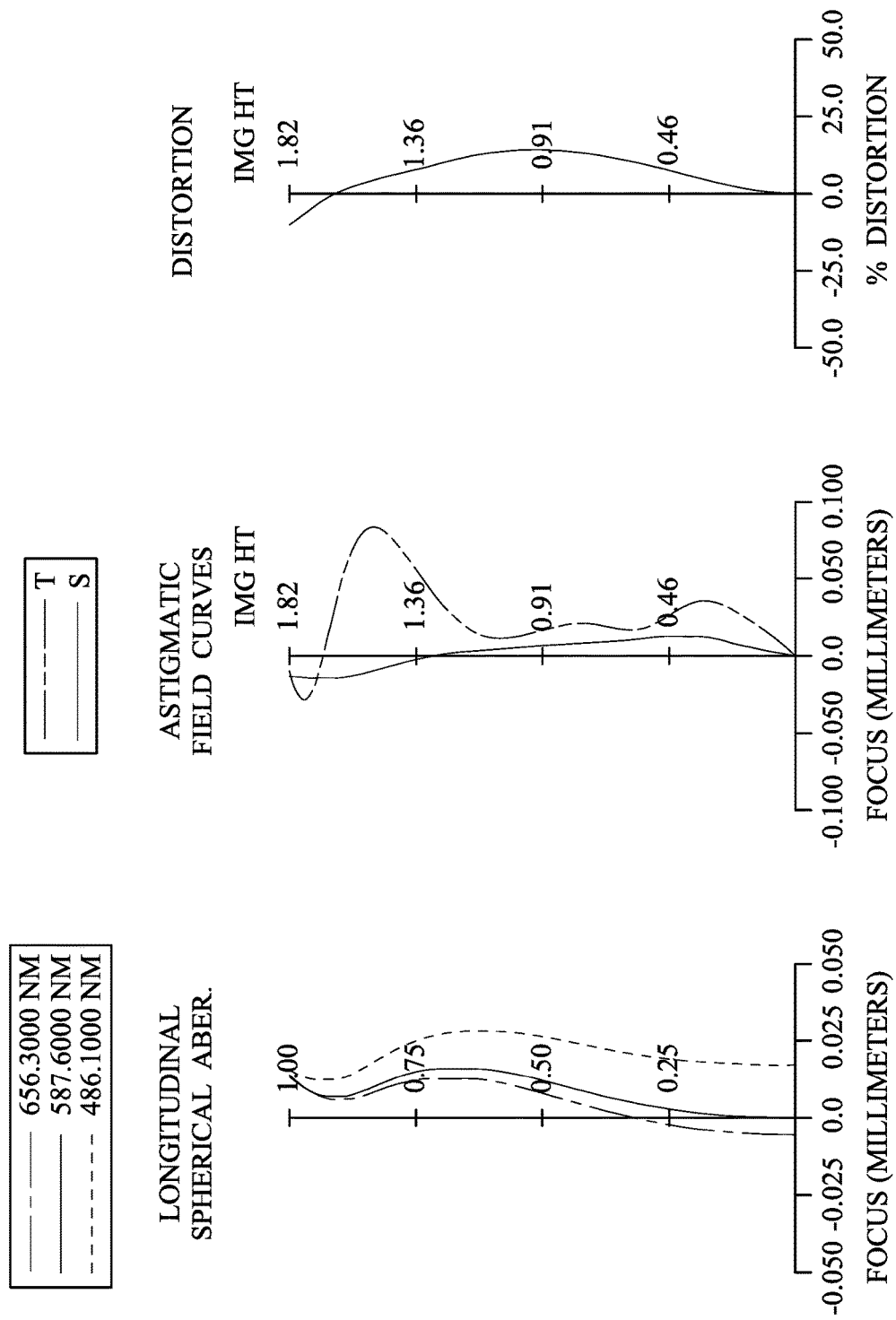
FIG. 2 shows spherical aberration curves, astigmatic field curves and a distortion curve of the image capturing device according to the 1st embodiment.

FIG. 1 is a schematic view of an image capturing device according to the 1st embodiment of the present disclosure. FIG. 2 shows spherical aberration curves, astigmatic field curves and a distortion curve of the image capturing device according to the 1st embodiment. In FIG. 1, the image capturing device includes an optical lens (its reference numeral is omitted) and an image sensor 190. The optical lens includes, in order from an object side to an image side, a first lens element 110, a second lens element 120, an aperture stop 100, a third lens element 130, a fourth lens element 140, a fifth lens element 150, a sixth lens element 160, an IR-cut filter 170 and an image surface 180, wherein the image sensor 190 is disposed on the image surface 180 of the optical lens. The optical lens has a total of sixth lens elements (110-160) with refractive power, and there is an air space between every two lens elements of the first lens element 110, the second lens element 120, the third lens element 130, the fourth lens element 140, the fifth lens element 150 and the sixth lens element 160 that are adjacent to each other.

The first lens element 110 with negative refractive power has an object-side surface 111 being convex in a paraxial region thereof and an image-side surface 112 being concave in a paraxial region thereof. The first lens element 110 is made of plastic material, and has the object-side surface 111 and the image-side surface 112 being both aspheric.

The second lens element 120 with negative refractive power has an object-side surface 121 being convex in a paraxial region thereof and an image-side surface 122 being concave in a paraxial region thereof. The second lens element 120 is made of plastic material, and has the object-side surface 121 and the image-side surface 122 being both aspheric.

The third lens element 130 with positive refractive power has an object-side surface 131 being convex in a paraxial region thereof and an image-side surface 132 being convex in a paraxial region thereof. The third lens element 130 is made of plastic material, and has the object-side surface 131 and the image-side surface 132 being both aspheric.

The fourth lens element 140 with positive refractive power has an object-side surface 141 being convex in a paraxial region thereof, and an image-side surface 142 being convex in a paraxial region thereof and including at least one concave shape in an off-axis region thereof. The fourth lens element 140 is made of plastic material, and has the object-side surface 141 and the image-side surface 142 being both aspheric.

The fifth lens element 150 with negative refractive power has an object-side surface 151 being concave in a paraxial region thereof, and an image-side surface 152 being concave in a paraxial region thereof and including at least one convex shape in an off-axis region thereof. The fifth lens element 150 is made of plastic material, and has the object-side surface 151 and the image-side surface 152 being both aspheric.

The sixth lens element 160 with positive refractive power has an object-side surface 161 being convex in a paraxial region thereof, and an image-side surface 162 being concave in a paraxial region thereof and including at least one convex shape in an off-axis region thereof. The sixth lens element 160 is made of plastic material, and has the object-side surface 161 and the image-side surface 162 being both aspheric.

The IR-cut filter 170 is made of glass material and located between the sixth lens element 160 and the image surface 180, and will not affect a focal length of the optical lens.

The equation of the aspheric surface profiles of the aforementioned lens elements of the 1st embodiment is expressed as follows:

$$X(Y) = (Y^2/R)/(1+sqrt(1-(1+k)\times(Y/R)^2)) + \sum_i (Ai)\times(Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the optical lens according to the 1st embodiment, when a focal length of the optical lens is f, an f-number of the optical lens is Fno, and half of a maximal field of view of the optical lens is HFOV, these parameters have the following values: f=1.00 mm; Fno=2.15; and HFOV=63.5 degrees.

In the optical lens according to the 1st embodiment, when half of the maximal field of view of the optical lens is HFOV, the following condition is satisfied: tan(HFOV)=2.01.

In the optical lens according to the 1st embodiment, when a refractive index of the first lens element 110 is N1, a refractive index of the second lens element 120 is N2, a refractive index of the third lens element 130 is N3, a refractive index of the fourth lens element 140 is N4, a refractive index of the fifth lens element 150 is N5, a refractive index of the sixth lens element 160 is N6, and a maximum of N1, N2, N3, N4, N5 and N6 is Nmax, the following condition is satisfied: Nmax=1.633.

In the optical lens according to the 1st embodiment, when an axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, and an axial distance between the fifth lens element 150 and the sixth lens element 160 is T56, the following conditions are satisfied: T12/T23=1.85; and T12/(T34+T45+T56)=1.51.

In the optical lens according to the 1st embodiment, when half of the maximal field of view of the optical lens is HFOV, and an axial distance between the object-side surface 111 of the first lens element 110 and the image surface 180 is TL, the following condition is satisfied: TL/sin(HFOV×1.6)=4.30 mm.

Figure 15:
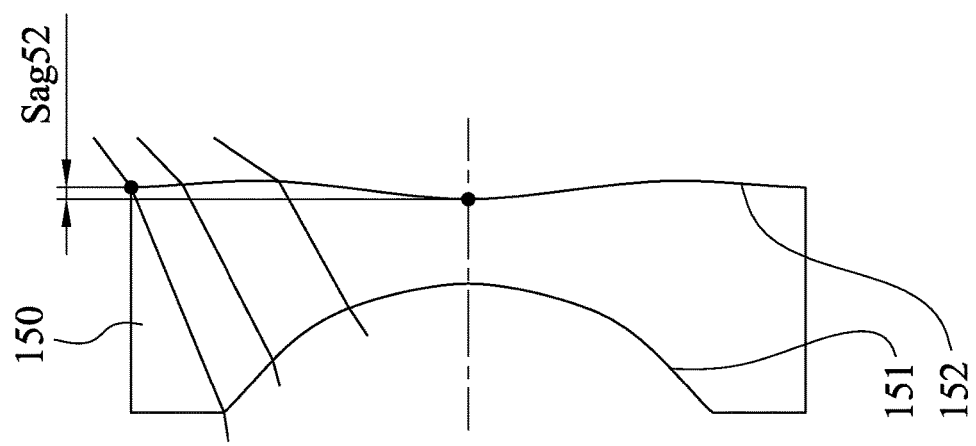
FIG. 15 shows a schematic view of the parameter Sag52 according to the 1st embodiment of FIG. 1.

FIG. 15 shows a schematic view of the parameter Sag52 according to the 1st embodiment of FIG. 1. In FIG. 15, when a distance in parallel with an optical axis from an axial vertex on the image-side surface 152 of the fifth lens element 150 to a maximum effective diameter position on the image-side surface 152 of the fifth lens element 150 is Sag52, and a central thickness of the fifth lens element 150 is CT5, the following condition is satisfied: CT5/|Sag52|=7.18.

In the optical lens according to the 1st embodiment, when the focal length of the optical lens is f, and a curvature radius of the object-side surface 161 of the sixth lens element 160 is R11, the following condition is satisfied: R11/f=0.56.

In the optical lens according to the 1st embodiment, when a focal length of the first lens element 110 is f1, and a focal length of the second lens element 120 is f2, the following condition is satisfied: |f1|/f2=−0.04.

In the optical lens according to the 1st embodiment, when a focal length of the fourth lens element 140 is f4, and a focal length of the sixth lens element 160 is f6, the following condition is satisfied: f6/f4=1.06.

In the optical lens according to the 1st embodiment, when a central thickness of the first lens element 110 is CT1, a central thickness of the second lens element 120 is CT2, a central thickness of the third lens element 130 is CT3, a central thickness of the fourth lens element 140 is CT4, and a central thickness of the sixth lens element 160 is CT6, the following conditions are satisfied: CT1<CT2; CT1<CT3; CT1<CT4; and CT1<CT6.

In the optical lens according to the 1st embodiment, when the focal length of the first lens element 110 is f1, the focal length of the second lens element 120 is f2, a focal length of the third lens element 130 is f3, the focal length of the fourth lens element 140 is f4, a focal length of the fifth lens element 150 is f5, and the focal length of the sixth lens element 160 is f, the following conditions are satisfied: |f5|<|f1|; |f5|<|f2|; |f5|<|f3|; |f5|<|f4|; and |f5|<|f6|.

The detailed optical data of the 1st embodiment are shown in Table 1 and the aspheric surface data are shown in Table 2 below.

TABLE 1

1st Embodiment
f = 1.00 mm, Fno = 2.15, HFOV = 63.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.018 | ASP | 0.255 | Plastic | 1.544 | 55.9 | −1.49 |
| 2 | | 0.553 | ASP | 0.425 | | | | |
| 3 | Lens 2 | 0.995 | ASP | 0.300 | Plastic | 1.633 | 23.4 | −33.50 |
| 4 | | 0.840 | ASP | 0.256 | | | | |
| 5 | Ape. Stop | Plano | | −0.026 | | | | |
| 6 | Lens 3 | 2.263 | ASP | 0.472 | Plastic | 1.514 | 56.8 | 1.59 |
| 7 | | −1.188 | ASP | 0.104 | | | | |
| 8 | Lens 4 | 2.440 | ASP | 0.640 | Plastic | 1.644 | 55.9 | 0.98 |
| 9 | | −0.623 | ASP | 0.095 | | | | |
| 10 | Lens 5 | −0.645 | ASP | 0.255 | Plastic | 1.633 | 23.4 | −0.62 |
| 11 | | 1.166 | ASP | 0.082 | | | | |
| 12 | Lens 6 | 0.564 | ASP | 0.636 | Plastic | 1.544 | 55.9 | 1.04 |
| 13 | | 83.034 | ASP | 0.400 | | | | |
| 14 | IR-cut filter | Plano | | 0.110 | Glass | 1.517 | 64.2 | — |
| 15 | | Plano | | 0.205 | | | | |
| 16 | Image | Plano | | — | | | | |

Note:
Reference wavelength is 587.6 nm (d-line).

TABLE 2

Aspheric Coefficients

| Surface # | | | | | | |
|---|---|---|---|---|---|---|
| | 1 | 2 | 3 | 4 | 6 | 7 |
| k = | −4.9227E−02 | −7.3854E−01 | 2.4401E−01 | −2.6108E+00 | 8.8144E+00 | −3.0299E+00 |
| A4 = | 3.1658E−01 | 4.4670E−01 | −1.1812E−02 | 1.5348E+00 | 2.4989E−02 | −1.2630E+00 |
| A6 = | −8.1019E−01 | −2.2742E−01 | 1.2351E+00 | 4.4101E+00 | −5.5532E−01 | 2.0216E+00 |
| A8 = | 7.8938E−01 | −1.1679E+01 | −1.6029E+01 | −4.4695E+01 | 6.8535E+00 | −1.0459E+01 |
| A10 = | −3.5874E−01 | 2.8169E+01 | 5.9385E+01 | 4.7020E+02 | −1.9666E+01 | 2.0715E+01 |
| A12 = | 6.3971E−02 | −1.8875E+01 | −7.2674E+01 | −9.6417E+02 | | |

| Surface # | | | | | | |
|---|---|---|---|---|---|---|
| | 8 | 9 | 10 | 11 | 12 | 13 |
| k = | 3.9565E−01 | −8.9787E−01 | −8.4168E−01 | −3.6612E+01 | −6.5044E+00 | 3.0359E+01 |
| A4 = | −5.3590E−01 | 2.7958E+00 | 3.7728E+00 | −8.3013E−02 | −7.6512E−02 | 3.6772E−01 |
| A6 = | 7.9918E−01 | −1.6443E+01 | −2.4033E+01 | −3.6156E−01 | 2.9110E−01 | −4.8043E−01 |
| A8 = | −1.4788E+00 | 4.8331E+01 | 7.6076E+01 | 7.2435E−01 | −7.4546E−01 | 2.2581E−01 |
| A10 = | −3.2925E+00 | −7.5388E+01 | −1.5158E+02 | −6.6294E−01 | 7.8278E−01 | −4.5073E−02 |
| A12 = | | 4.7744E+01 | 1.7735E+02 | 3.9845E−01 | −3.8651E−01 | 2.1856E−02 |
| A14 = | | | −8.7128E+01 | −1.1724E−01 | 7.3004E−02 | −1.6020E−02 |
| A16 = | | | | | | 3.3656E−03 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
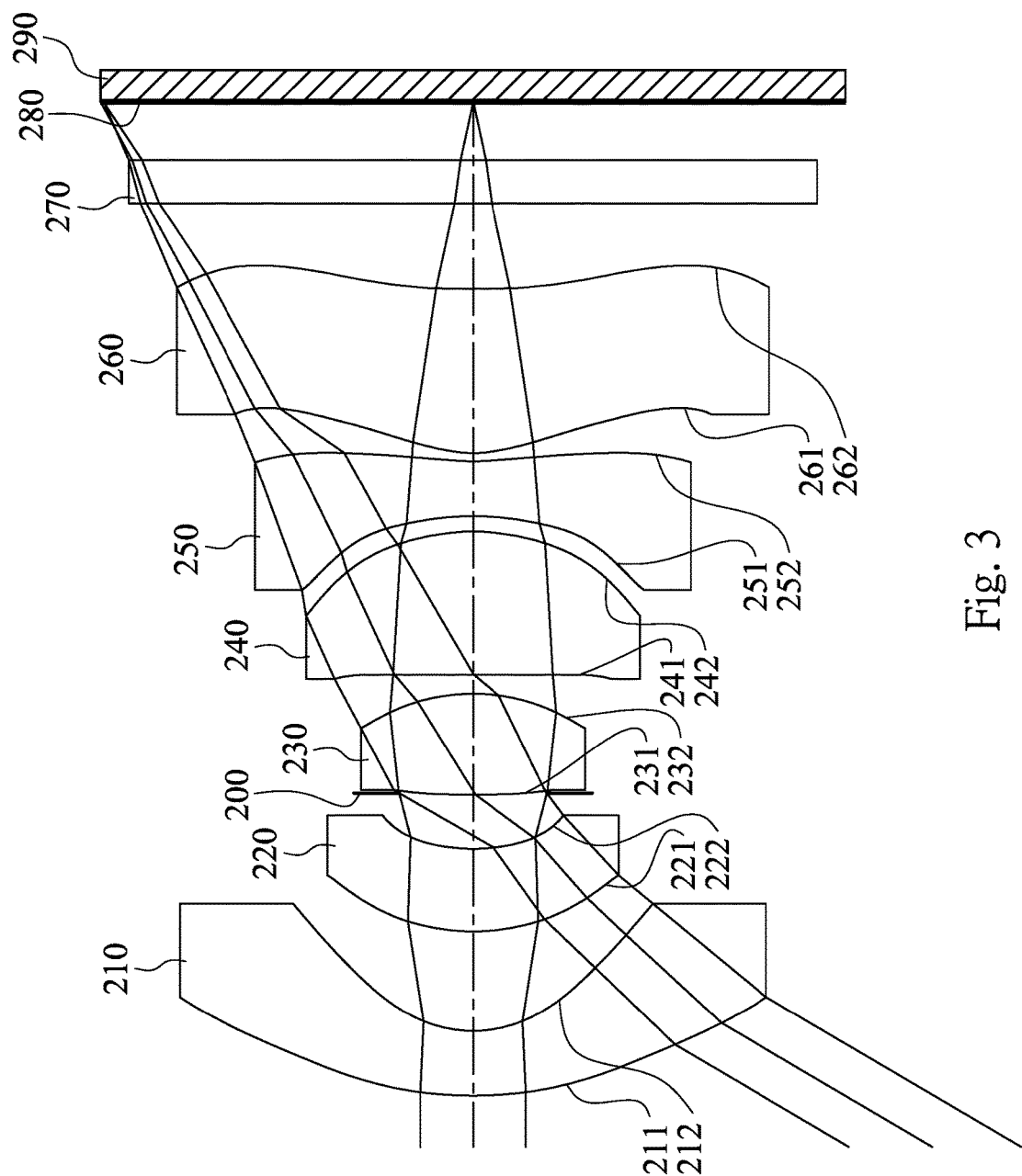
FIG. 3 is a schematic view of an image capturing device according to the 2nd embodiment of the present disclosure.
Figure 4:
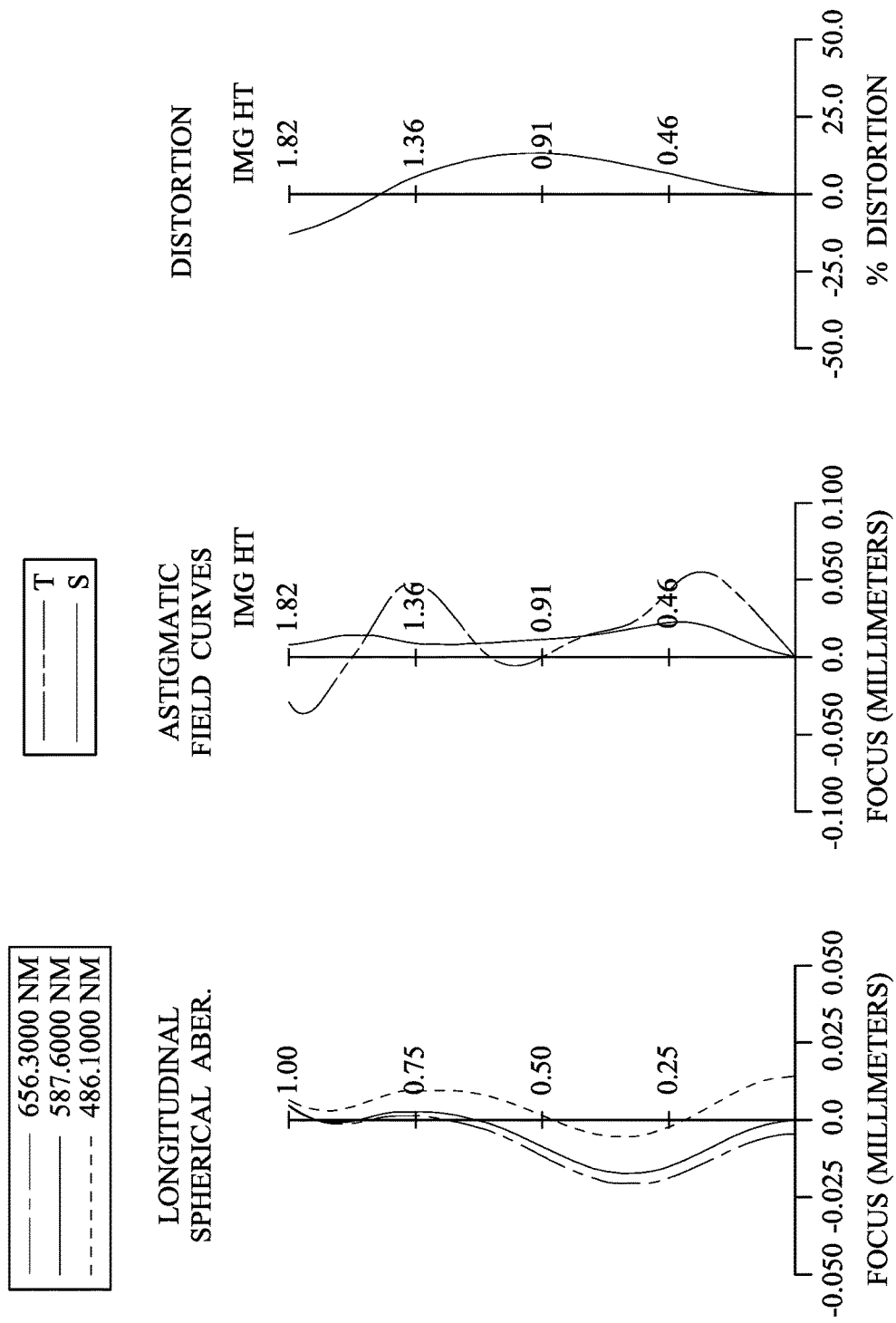
FIG. 4 shows spherical aberration curves, astigmatic field curves and a distortion curve of the image capturing device according to the 2nd embodiment.

FIG. 3 is a schematic view of an image capturing device according to the 2nd embodiment of the present disclosure. FIG. 4 shows spherical aberration curves, astigmatic field curves and a distortion curve of the image capturing device according to the 2nd embodiment. In FIG. 3, the image capturing device includes an optical lens (its reference numeral is omitted) and an image sensor 290. The optical lens includes, in order from an object side to an image side, a first lens element 210, a second lens element 220, an aperture stop 200, a third lens element 230, a fourth lens element 240, a fifth lens element 250, a sixth lens element 260, an IR-cut filter 270 and an image surface 280, wherein the image sensor 290 is disposed on the image surface 280 of the optical lens. The optical lens has a total of sixth lens elements (210-260) with refractive power, and there is an air space between every two lens elements of the first lens element 210, the second lens element 220, the third lens element 230, the fourth lens element 240, the fifth lens element 250 and the sixth lens element 260 that are adjacent to each other.

The first lens element 210 with negative refractive power has an object-side surface 211 being convex in a paraxial region thereof and an image-side surface 212 being concave in a paraxial region thereof. The first lens element 210 is made of plastic material, and has the object-side surface 211 and the image-side surface 212 being both aspheric.

The second lens element 220 with positive refractive power has an object-side surface 221 being convex in a paraxial region thereof and an image-side surface 222 being concave in a paraxial region thereof. The second lens element 220 is made of plastic material, and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of plastic material, and has the object-side surface 231 and the image-side surface 232 being both aspheric.

The fourth lens element 240 with positive refractive power has an object-side surface 241 being concave in a paraxial region thereof, and an image-side surface 242 being convex in a paraxial region thereof and including at least one concave shape in an off-axis region thereof. The fourth lens element 240 is made of plastic material, and has the object-side surface 241 and the image-side surface 242 being both aspheric.

The fifth lens element 250 with negative refractive power has an object-side surface 251 being concave in a paraxial region thereof, and an image-side surface 252 being concave in a paraxial region thereof and including at least one convex shape in an off-axis region thereof. The fifth lens element 250 is made of plastic material, and has the object-side surface 251 and the image-side surface 252 being both aspheric.

The sixth lens element 260 with positive refractive power has an object-side surface 261 being convex in a paraxial region thereof, and an image-side surface 262 being concave in a paraxial region thereof and including at least one convex shape in an off-axis region thereof. The sixth lens element 260 is made of plastic material, and has the object-side surface 261 and the image-side surface 262 being both aspheric.

The IR-cut filter 270 is made of glass material and located between the sixth lens element 260 and the image surface 280, and will not affect a focal length of the optical lens.

The detailed optical data of the 2nd embodiment are shown in Table 3 and the aspheric surface data are shown in Table 4 below.

TABLE 3

2nd Embodiment
f = 1.23 mm, Fno = 2.38, HFOV = 59.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 2.156 ASP | 0.316 | Plastic | 1.544 | 55.9 | −1.77 |
| 2 | | 0.632 ASP | 0.487 | | | | |
| 3 | Lens 2 | 1.073 ASP | 0.403 | Plastic | 1.645 | 22.5 | 18.26 |
| 4 | | 1.007 ASP | 0.271 | | | | |
| 5 | Ape. Stop | Plano | −0.008 | | | | |
| 6 | Lens 3 | 4.609 ASP | 0.495 | Plastic | 1.535 | 55.7 | 1.49 |
| 7 | | −0.930 ASP | 0.093 | | | | |
| 8 | Lens 4 | −13.833 ASP | 0.697 | Plastic | 1.535 | 55.7 | 2.10 |
| 9 | | −1.059 ASP | 0.076 | | | | |
| 10 | Lens 5 | −1.344 ASP | 0.270 | Plastic | 1.645 | 22.5 | −1.01 |
| 11 | | 1.351 ASP | 0.040 | | | | |
| 12 | Lens 6 | 0.638 ASP | 0.800 | Plastic | 1.544 | 55.9 | 1.22 |
| 13 | | 8.813 ASP | 0.419 | | | | |
| 14 | IR-cut filter | Plano | 0.210 | Glass | 1.517 | 64.2 | — |
| 15 | | Plano | 0.285 | | | | |
| 16 | Image | Plano | — | | | | |

Note:
Reference wavelength is 587.6 nm (d-line).

TABLE 4

Aspheric Coefficients

| | Surface # | | | | | |
|---|---|---|---|---|---|---|
| | 1 | 2 | 3 | 4 | 6 | 7 |
| k = | −6.2694E−02 | −7.7175E−01 | 1.0203E−01 | −1.8197E+00 | 7.3347E+01 | −5.9589E+00 |
| A4 = | 1.7715E−01 | 3.7902E−01 | −4.4158E−01 | 1.0408E+00 | 4.4296E−01 | −9.4897E−01 |
| A6 = | −3.2289E−01 | −8.7987E−01 | 1.4120E+00 | −1.4223E+00 | −1.5785E+01 | 7.7901E+00 |
| A8 = | 2.2767E−01 | 9.4688E−01 | −8.3321E+00 | 1.0142E+02 | 3.7328E+02 | −9.8073E+01 |
| A10 = | −8.9832E−02 | −5.3241E+00 | 2.7021E+01 | −1.2939E+03 | −4.9099E+03 | 7.0348E+02 |
| A12 = | 2.3859E−02 | 1.2348E+01 | −5.1534E+01 | 9.2029E+03 | 3.6855E+04 | −2.8651E+03 |
| A14 = | −4.9108E−03 | −1.1195E+01 | 5.8472E+01 | −3.0881E+04 | −1.4520E+05 | 6.1838E+03 |
| A16 = | 6.0765E−04 | 3.5230E+00 | −3.5683E+01 | 4.0081E+04 | 2.3223E+05 | −5.3510E+03 |

| | Surface # | | | | | |
|---|---|---|---|---|---|---|
| | 8 | 9 | 10 | 11 | 12 | 13 |
| k = | 9.0000E+01 | −2.1221E−01 | 9.2211E−01 | −4.2143E+01 | −8.2127E+00 | −4.4046E+00 |
| A4 = | 4.6803E−01 | 3.7134E−01 | 4.2203E−01 | −7.3321E−01 | 6.8748E−02 | 6.6934E−01 |
| A6 = | −2.1324E+00 | −1.1087E+00 | −3.6910E−01 | 2.8509E+00 | −9.1382E−01 | −1.6533E+00 |
| A8 = | 6.2700E+00 | −3.4985E+00 | −4.5836E+00 | −5.6666E+00 | 2.2292E+00 | 1.9444E+00 |
| A10 = | −1.3252E+01 | 1.9532E+01 | 9.2953E+00 | 5.8564E+00 | −2.5713E+00 | −1.3127E+00 |
| A12 = | 2.1989E+00 | −3.7505E+01 | −7.6654E+00 | −3.0255E+00 | 1.4212E+00 | 5.0231E−01 |
| A14 = | 3.5065E+01 | 3.2860E+01 | 6.7683E+00 | 5.6856E−01 | −3.0842E−01 | −1.0074E−01 |
| A16 = | −3.8438E+01 | −1.0169E+01 | −3.7196E+00 | 3.4356E−02 | | 8.2114E−03 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 1.23 | T12/(T34 + T45 + T56) | 2.33 |
| Fno | 2.38 | TL/sin(HFOV × 1.6) [mm] | 4.87 |
| HFOV [deg.] | 59.5 | CT5/|Sag52| | 48.68 |
| tan(HFOV) | 1.70 | R11/f | 0.52 |
| Nmax | 1.645 | |f1|/f2 | 0.10 |
| T12/T23 | 1.85 | f6/f4 | 0.58 |

Furthermore, according to the 2nd embodiment, when a central thickness of the first lens element 210 is CT1, a central thickness of the second lens element 220 is CT2, a central thickness of the third lens element 230 is CT3, a central thickness of the fourth lens element 240 is CT4, and a central thickness of the sixth lens element 260 is CT6, the following conditions are satisfied: CT1<CT2; CT1<CT3; CT1<CT4; and CT1<CT6.

According to the 2nd embodiment, when the focal length of the first lens element 210 is f1, the focal length of the second lens element 220 is f2, a focal length of the third lens element 230 is f3, the focal length of the fourth lens element 240 is f4, a focal length of the fifth lens element 250 is f5, and the focal length of the sixth lens element 260 is f6, the following conditions are satisfied: |f5|<|f1|; |f5|<|f2|; |f5|<|f3|; |f5|<|f4|; and |f5|<|f6|.

3rd Embodiment

Figure 5:
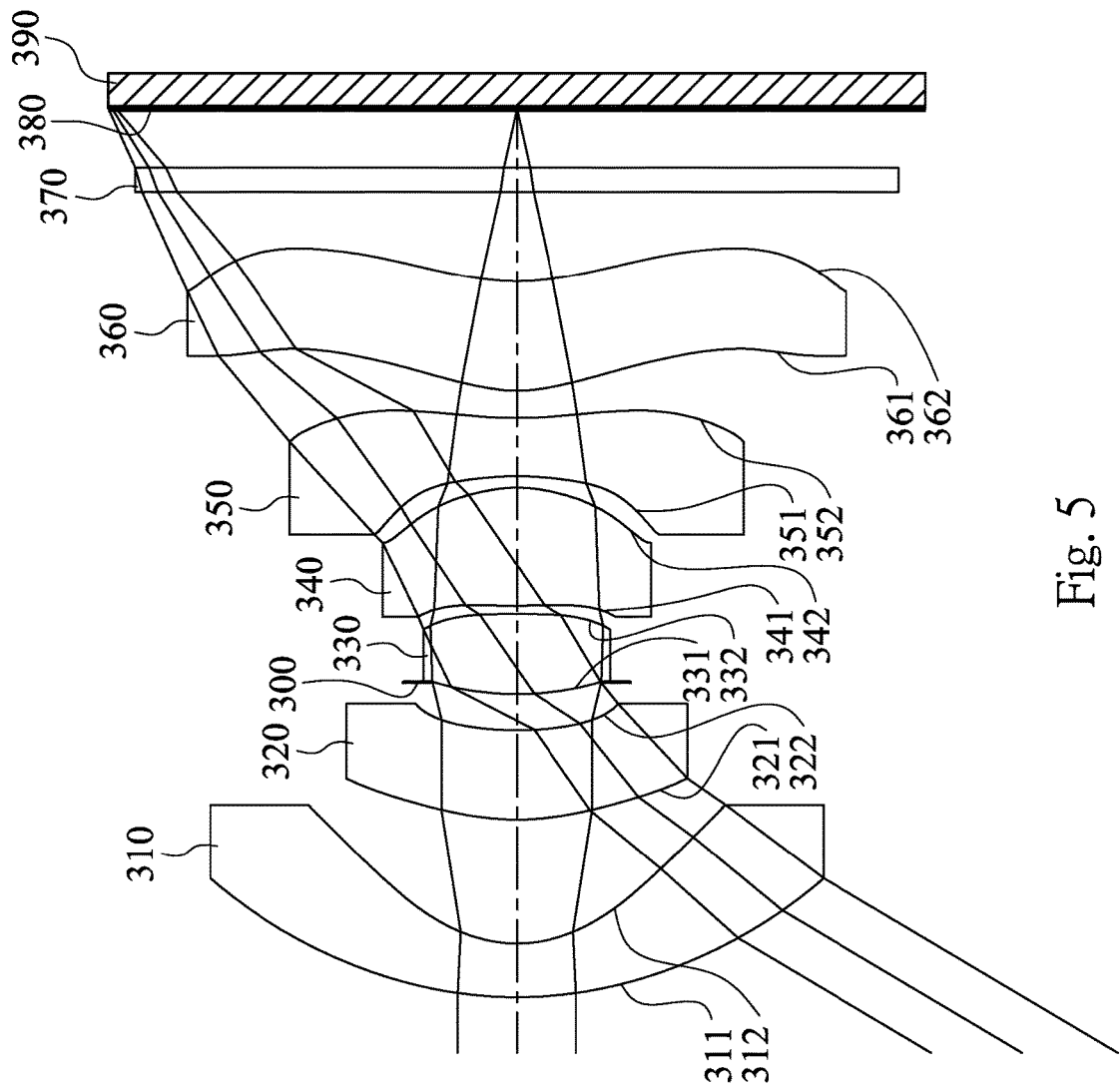
FIG. 5 is a schematic view of an image capturing device according to the 3rd embodiment of the present disclosure.
Figure 6:
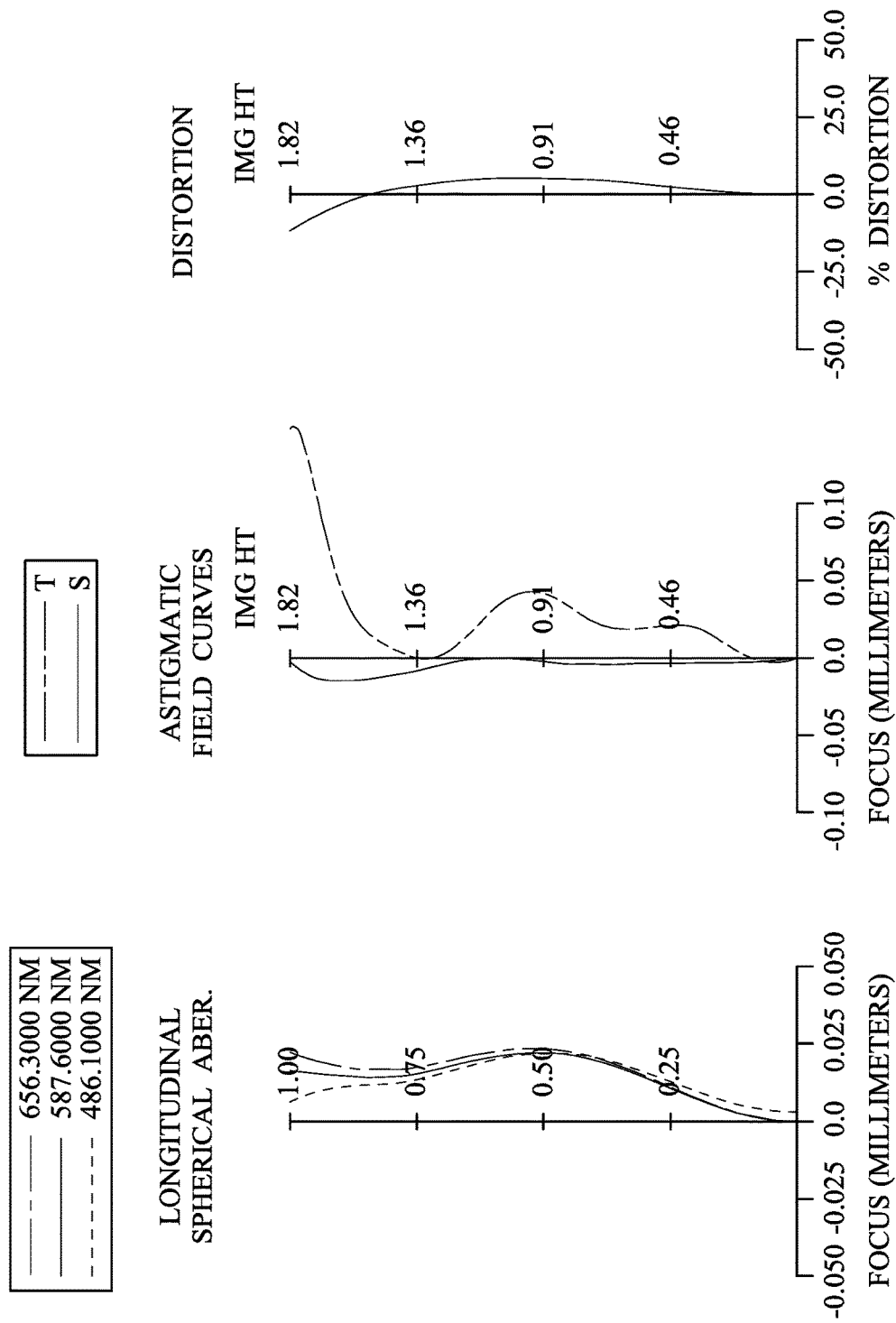
FIG. 6 shows spherical aberration curves, astigmatic field curves and a distortion curve of the image capturing device according to the 3rd embodiment.

FIG. 5 is a schematic view of an image capturing device according to the 3rd embodiment of the present disclosure. FIG. 6 shows spherical aberration curves, astigmatic field curves and a distortion curve of the image capturing device according to the 3rd embodiment. In FIG. 5, the image capturing device includes an optical lens (its reference numeral is omitted) and an image sensor 390. The optical lens includes, in order from an object side to an image side, a first lens element 310, a second lens element 320, an aperture stop 300, a third lens element 330, a fourth lens element 340, a fifth lens element 350, a sixth lens element 360, an IR-cut filter 370 and an image surface 280, wherein the image sensor 290 is disposed on the image surface 380 of the optical lens. The optical lens has a total of sixth lens elements (310-360) with refractive power, and there is an air space between every two lens elements of the first lens element 310, the second lens element 320, the third lens element 330, the fourth lens element 340, the fifth lens element 350 and the sixth lens element 360 that are adjacent to each other.

The first lens element 310 with negative refractive power has an object-side surface 311 being convex in a paraxial region thereof and an image-side surface 312 being concave in a paraxial region thereof. The first lens element 310 is made of plastic material, and has the object-side surface 311 and the image-side surface 312 being both aspheric.

The second lens element 320 with positive refractive power has an object-side surface 321 being convex in a paraxial region thereof and an image-side surface 322 being concave in a paraxial region thereof. The second lens element 320 is made of plastic material, and has the object-side surface 321 and the image-side surface 322 being both aspheric.

The third lens element 330 with positive refractive power has an object-side surface 331 being convex in a paraxial region thereof and an image-side surface 332 being convex in a paraxial region thereof. The third lens element 330 is made of plastic material, and has the object-side surface 331 and the image-side surface 332 being both aspheric.

The fourth lens element 340 with positive refractive power has an object-side surface 341 being convex in a paraxial region thereof, and an image-side surface 342 being convex in a paraxial region thereof and including at least one concave shape in an off-axis region thereof. The fourth lens element 340 is made of plastic material, and has the object-side surface 341 and the image-side surface 342 being both aspheric.

The fifth lens element 350 with negative refractive power has an object-side surface 351 being concave in a paraxial region thereof, and an image-side surface 352 being concave in a paraxial region thereof and including at least one convex shape in an off-axis region thereof. The fifth lens element 350 is made of plastic material, and has the object-side surface 351 and the image-side surface 352 being both aspheric.

The sixth lens element 360 with positive refractive power has an object-side surface 361 being convex in a paraxial region thereof, and an image-side surface 362 being concave in a paraxial region thereof and including at least one convex shape in an off-axis region thereof. The sixth lens element 360 is made of plastic material, and has the object-side surface 361 and the image-side surface 362 being both aspheric.

The IR-cut filter 370 is made of glass material and located between the sixth lens element 360 and the image surface 380, and will not affect a focal length of the optical lens.

The detailed optical data of the 3rd embodiment are shown in Table 5 and the aspheric surface data are shown in Table 6 below.

TABLE 5

3rd Embodiment
f = 1.22 mm, Fno = 2.29, HFOV = 59.3 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 2.000 ASP | 0.240 | Plastic | 1.544 | 55.9 | −1.77 |
| 2 | | 0.623 ASP | 0.558 | | | | |
| 3 | Lens 2 | 1.234 ASP | 0.401 | Plastic | 1.639 | 23.5 | 6.34 |
| 4 | | 1.550 ASP | 0.214 | | | | |
| 5 | Ape. Stop | Plano | −0.052 | | | | |
| 6 | Lens 3 | 1.457 ASP | 0.359 | Plastic | 1.544 | 55.9 | 2.18 |
| 7 | | −5.780 ASP | 0.037 | | | | |
| 8 | Lens 4 | 4.765 ASP | 0.532 | Plastic | 1.544 | 55.9 | 1.05 |
| 9 | | −0.624 ASP | 0.052 | | | | |
| 10 | Lens 5 | −1.116 ASP | 0.260 | Plastic | 1.639 | 23.5 | −1.01 |
| 11 | | 1.678 ASP | 0.122 | | | | |
| 12 | Lens 6 | 0.694 ASP | 0.493 | Plastic | 1.544 | 55.9 | 2.31 |
| 13 | | 1.161 ASP | 0.400 | | | | |
| 14 | IR-cut filter | Plano | 0.110 | Glass | 1.517 | 64.2 | — |
| 15 | | Plano | 0.266 | | | | |
| 16 | Image | Plano | — | | | | |

Note:
Reference wavelength is 587.6 nm (d-line).
An effective radius of surface 9 is 0.602 mm.

TABLE 6

Aspheric Coefficients

| Surface # | | | | | |
|---|---|---|---|---|---|
| | 1 | 2 | 3 | 4 | 6 | 7 |
| k = | 6.6510E−01 | −7.4191E−01 | 1.5808E−01 | −4.9821E+01 | −4.1944E+01 | 7.7108E+01 |
| A4 = | 4.9732E−02 | 3.1281E−02 | −2.9219E−01 | 2.1238E+00 | 1.7435E+00 | −1.5372E+00 |
| A6 = | −1.4418E−01 | −3.0106E−01 | −6.9012E−02 | −1.4986E+01 | −7.8759E+00 | 4.1014E−02 |
| A8 = | 1.2291E−01 | −5.5456E−01 | −8.8010E−01 | 1.3307E+02 | 2.9283E+01 | −1.7734E+01 |
| A10 = | −4.9994E−02 | 6.6756E−01 | 3.8858E+00 | −5.9453E+02 | −3.1698E+01 | 1.0875E+02 |
| A12 = | 6.9888E−03 | −1.4797E−01 | −3.4025E+00 | 1.2908E+03 | −1.5926E+02 | −2.4371E+02 |

| Surface # | | | | | |
|---|---|---|---|---|---|
| | 8 | 9 | 10 | 11 | 12 | 13 |
| k = | −2.0230E+01 | −1.0363E+00 | 2.7882E−01 | −8.9105E+01 | −7.6251E+00 | −4.9220E−01 |
| A4 = | −1.4020E+00 | 3.3735E+00 | 3.3679E+00 | 2.4872E−01 | −2.2356E−01 | −5.8941E−01 |
| A6 = | 1.3879E−01 | −3.2539E+01 | −3.0602E+01 | −2.2698E+00 | 1.8790E−01 | 4.7706E−01 |
| A8 = | −1.9381E+01 | 1.4231E+02 | 1.1570E+02 | 5.6244E+00 | 3.0428E−02 | −3.3868E−01 |
| A10 = | 4.2267E+01 | −3.3557E+02 | −2.5375E+02 | −7.8399E+00 | −2.2646E−01 | 1.5986E−01 |
| A12 = | | 3.4845E+02 | 2.6826E+02 | 5.8524E+00 | 1.5386E−01 | −5.1300E−02 |
| A14 = | | | −6.0171E+01 | −1.7946E+00 | −3.1275E−02 | 7.5929E−03 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 1.22 | T12/(T34 + T45 + T56) | 2.64 |
| Fno | 2.29 | TL/sin(HFOV × 1.6) [mm] | 4.01 |
| HFOV [deg.] | 59.3 | CT5/|Sag52| | 2.48 |
| tan(HFOV) | 1.68 | R11/f | 0.57 |
| Nmax | 1.639 | |f1|/f2 | 0.28 |
| T12/T23 | 3.44 | f6/f4 | 2.20 |

Furthermore, according to the 3rd embodiment, when a central thickness of the first lens element 310 is CT1, a central thickness of the second lens element 320 is CT2, a central thickness of the third lens element 330 is CT3, a central thickness of the fourth lens element 340 is CT4, and a central thickness of the sixth lens element 360 is CT6, the following conditions are satisfied: CT1<CT2; CT1<CT3; CT1<CT4; and CT1<CT6.

According to the 3rd embodiment, when the focal length of the first lens element 310 is f1, the focal length of the second lens element 320 is f2, a focal length of the third lens element 330 is f3, the focal length of the fourth lens element 340 is f4, a focal length of the fifth lens element 350 is f5, and the focal length of the sixth lens element 360 is f6, the following conditions are satisfied: |f5|<|f1|; |f5|<|f2|; |f5|<|f3|; |f5|<|f4|; and |f5|<|f6|.

4th Embodiment

Figure 7:
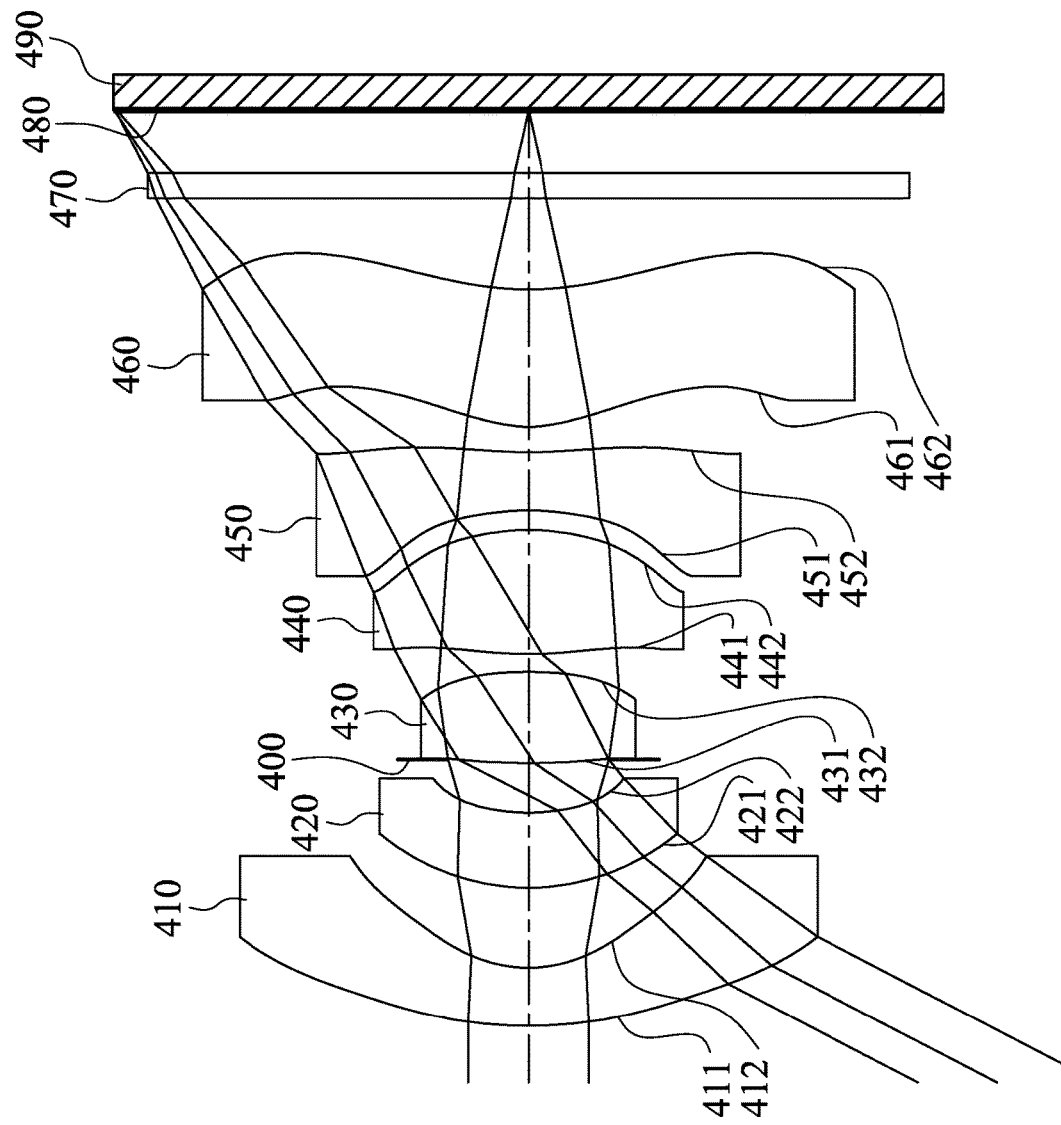
FIG. 7 is a schematic view of an image capturing device according to the 4th embodiment of the present disclosure.
Figure 8:
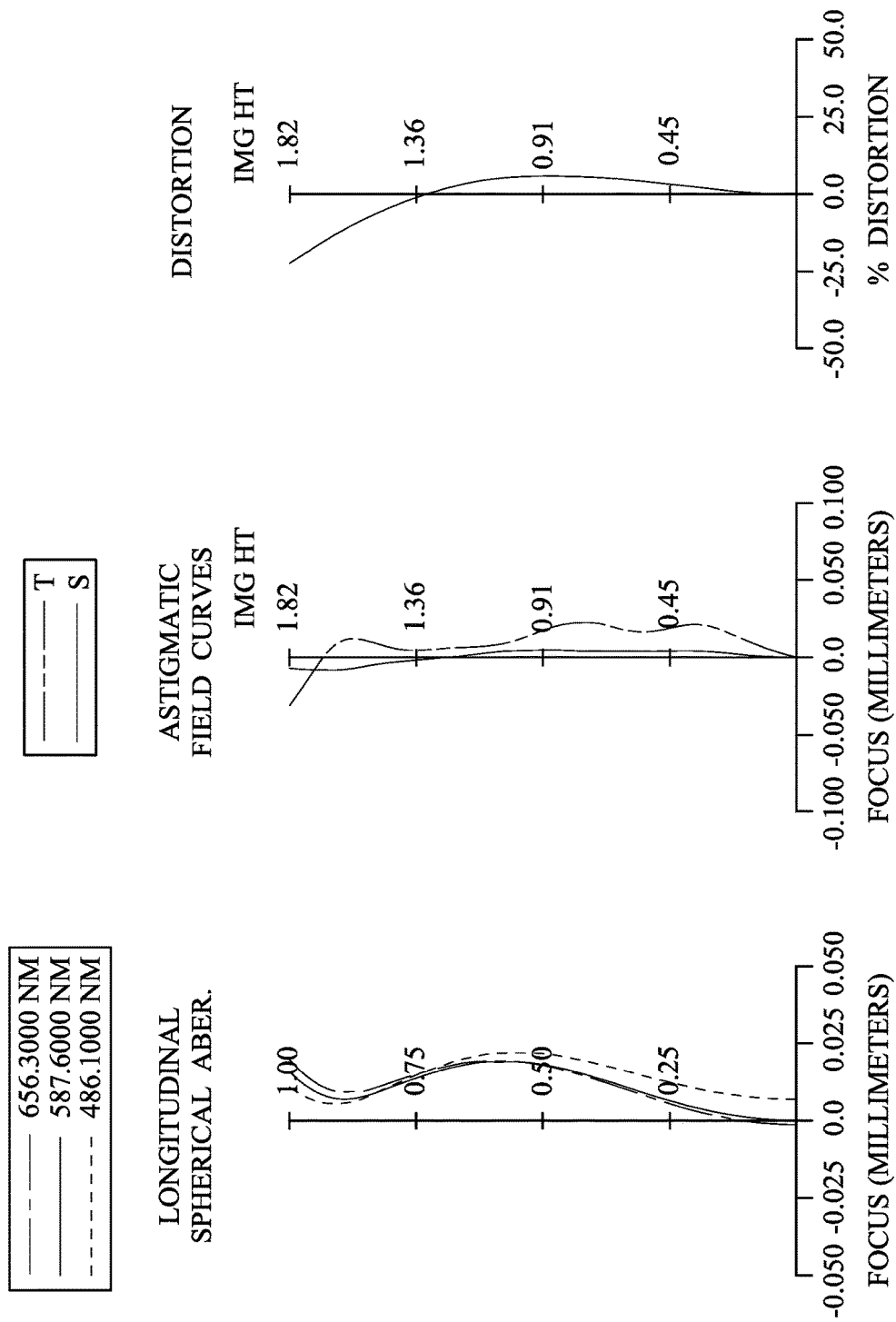
FIG. 8 shows spherical aberration curves, astigmatic field curves and a distortion curve of the image capturing device according to the 4th embodiment.

FIG. 7 is a schematic view of an image capturing device according to the 4th embodiment of the present disclosure. FIG. 8 shows spherical aberration curves, astigmatic field curves and a distortion curve of the image capturing device according to the 4th embodiment. In FIG. 7, the image capturing device includes an optical lens (its reference numeral is omitted) and an image sensor 490. The optical lens includes, in order from an object side to an image side, a first lens element 410, a second lens element 420, an aperture stop 400, a third lens element 430, a fourth lens element 440, a fifth lens element 450, a sixth lens element 460, an IR-cut filter 470 and an image surface 480, wherein the image sensor 490 is disposed on the image surface 480 of the optical lens. The optical lens has a total of sixth lens elements (410-460) with refractive power, and there is an air space between every two lens elements of the first lens element 410, the second lens element 420, the third lens element 430, the fourth lens element 440, the fifth lens element 450 and the sixth lens element 460 that are adjacent to each other.

The first lens element 410 with negative refractive power has an object-side surface 411 being convex in a paraxial region thereof and an image-side surface 412 being concave in a paraxial region thereof. The first lens element 410 is made of plastic material, and has the object-side surface 411 and the image-side surface 412 being both aspheric.

The second lens element 420 with positive refractive power has an object-side surface 421 being convex in a paraxial region thereof and an image-side surface 422 being concave in a paraxial region thereof. The second lens element 420 is made of plastic material, and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of plastic material, and has the object-side surface 431 and the image-side surface 432 being both aspheric.

The fourth lens element 440 with positive refractive power has an object-side surface 441 being convex in a paraxial region thereof, and an image-side surface 442 being convex in a paraxial region thereof and including at least one concave shape in an off-axis region thereof. The fourth lens element 440 is made of plastic material, and has the object-side surface 441 and the image-side surface 442 being both aspheric.

The fifth lens element 450 with negative refractive power has an object-side surface 451 being concave in a paraxial region thereof, and an image-side surface 452 being concave in a paraxial region thereof and including at least one convex shape in an off-axis region thereof. The fifth lens element 450 is made of plastic material, and has the object-side surface 451 and the image-side surface 452 being both aspheric.

The sixth lens element 460 with positive refractive power has an object-side surface 461 being convex in a paraxial region thereof, and an image-side surface 462 being concave in a paraxial region thereof and including at least one convex shape in an off-axis region thereof. The sixth lens element 460 is made of plastic material, and has the object-side surface 461 and the image-side surface 462 being both aspheric.

The IR-cut filter 470 is made of glass material and located between the sixth lens element 460 and the image surface 480, and will not affect a focal length of the optical lens.

The detailed optical data of the 4th embodiment are shown in Table 7 and the aspheric surface data are shown in Table 8 below.

TABLE 7

4th Embodiment
f = 1.21 mm, Fno = 2.29, HFOV = 62.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.320 | ASP | 0.255 | Plastic | 1.544 | 55.9 | −1.64 |
| 2 | | 0.618 | ASP | 0.350 | | | | |
| 3 | Lens 2 | 0.971 | ASP | 0.330 | Plastic | 1.639 | 23.5 | 11.15 |
| 4 | | 0.975 | ASP | 0.233 | | | | |
| 5 | Ape. Stop | Plano | | −0.016 | | | | |
| 6 | Lens 3 | 3.083 | ASP | 0.402 | Plastic | 1.544 | 55.9 | 2.30 |
| 7 | | −2.008 | ASP | 0.079 | | | | |
| 8 | Lens 4 | 1.693 | ASP | 0.544 | Plastic | 1.544 | 55.9 | 1.18 |
| 9 | | −0.923 | ASP | 0.085 | | | | |
| 10 | Lens 5 | −1.050 | ASP | 0.255 | Plastic | 1.639 | 23.5 | −1.00 |
| 11 | | 1.784 | ASP | 0.114 | | | | |
| 12 | Lens 6 | 0.585 | ASP | 0.602 | Plastic | 1.544 | 55.9 | 1.47 |
| 13 | | 1.387 | ASP | 0.400 | | | | |
| 14 | IR-cut filter | Plano | | 0.110 | Glass | 1.517 | 64.2 | — |
| 15 | | Plano | | 0.278 | | | | |
| 16 | Image | Plano | | — | | | | |

Note:
Reference wavelength is 587.6 nm (d-line).
An effective radius of surface 9 is 0.680 mm.

TABLE 8

Aspheric Coefficients

| Surface # | | | | | |
|---|---|---|---|---|---|
| 1 | 2 | 3 | 4 | 6 | 7 |

| | 1 | 2 | 3 | 4 | 6 | 7 |
|---|---|---|---|---|---|---|
| k = | 7.8130E−01 | −5.9483E−01 | 4.1545E−02 | −4.2152E+00 | −7.1386E+01 | 6.7053E+00 |
| A4 = | 2.8900E−01 | 2.8338E−01 | −1.2832E−01 | 1.3309E+00 | 2.0773E−01 | −1.5676E+00 |
| A6 = | −7.8629E−01 | −3.3970E−01 | 1.5512E+00 | 4.4136E+00 | 4.4017E−01 | 4.0307E+00 |
| A8 = | 7.9195E−01 | −1.1156E+01 | −1.7799E+01 | −5.1361E+01 | −9.1240E+00 | −1.6428E+01 |
| A10 = | −3.6265E−01 | 2.7921E+01 | 6.4628E+01 | 4.9786E+02 | 3.6220E+01 | 2.6340E+01 |
| A12 = | 6.3971E−02 | −1.8875E+01 | −7.2674E+01 | −9.6417E+02 | | |

| | 8 | 9 | 10 | 11 | 12 | 13 |
|---|---|---|---|---|---|---|
| k = | −5.9166E−01 | −2.6962E−01 | −4.8300E−01 | −9.0000E+01 | −6.0422E+00 | −4.9498E−01 |
| A4 = | −1.1343E+00 | 1.7989E+00 | 2.4056E+00 | −3.2929E−01 | −1.9229E−01 | −2.1528E−01 |
| A6 = | 3.5339E+00 | −1.6929E+01 | −2.1501E+01 | 3.3271E−01 | −2.6572E−01 | −2.3782E−01 |
| A8 = | −1.1338E+01 | 6.4067E+01 | 7.8220E+01 | 5.1354E−02 | 9.8844E−01 | 5.8855E−01 |
| A10 = | 1.3852E+01 | −1.2192E+02 | −1.6934E+02 | −9.8256E−01 | −1.4276E+00 | −6.2474E−01 |
| A12 = | | 9.6765E+01 | 2.1172E+02 | 1.5261E+00 | 9.1548E−01 | 3.5322E−01 |
| A14 = | | | −1.0877E+02 | −6.8369E−01 | −2.1057E−01 | −1.0456E−01 |
| A16 = | | | | | | 1.2796E−02 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 1.21 | T12/(T34 + T45 + T56) | 1.26 |
| Fno | 2.29 | TL/sin(HFOV × 1.6) [mm] | 4.08 |
| HFOV [deg.] | 62.5 | CT5/|Sag52| | 42.10 |
| tan(HFOV) | 1.92 | R11/f | 0.48 |
| Nmax | 1.639 | |f1|/f2 | 0.15 |
| T12/T23 | 1.61 | f6/f4 | 1.25 |

Furthermore, according to the 4th embodiment, when a central thickness of the first lens element 410 is CT1, a central thickness of the second lens element 420 is CT2, a central thickness of the third lens element 430 is CT3, a central thickness of the fourth lens element 440 is CT4, and a central thickness of the sixth lens element 460 is CT6, the following conditions are satisfied: CT1<CT2; CT1<CT3; CT1<CT4; and CT1<CT6.

According to the 4th embodiment, when the focal length of the first lens element 410 is f1, the focal length of the second lens element 420 is f2, a focal length of the third lens element 430 is f3, the focal length of the fourth lens element 440 is f4, a focal length of the fifth lens element 450 is f5, and the focal length of the sixth lens element 460 is f6, the following conditions are satisfied: |f5|<|f1|; |f5|<|f2|; |f5|<|f3|; |f5|<|f4|; and |f5|<|f6|.

5th Embodiment

Figure 9:
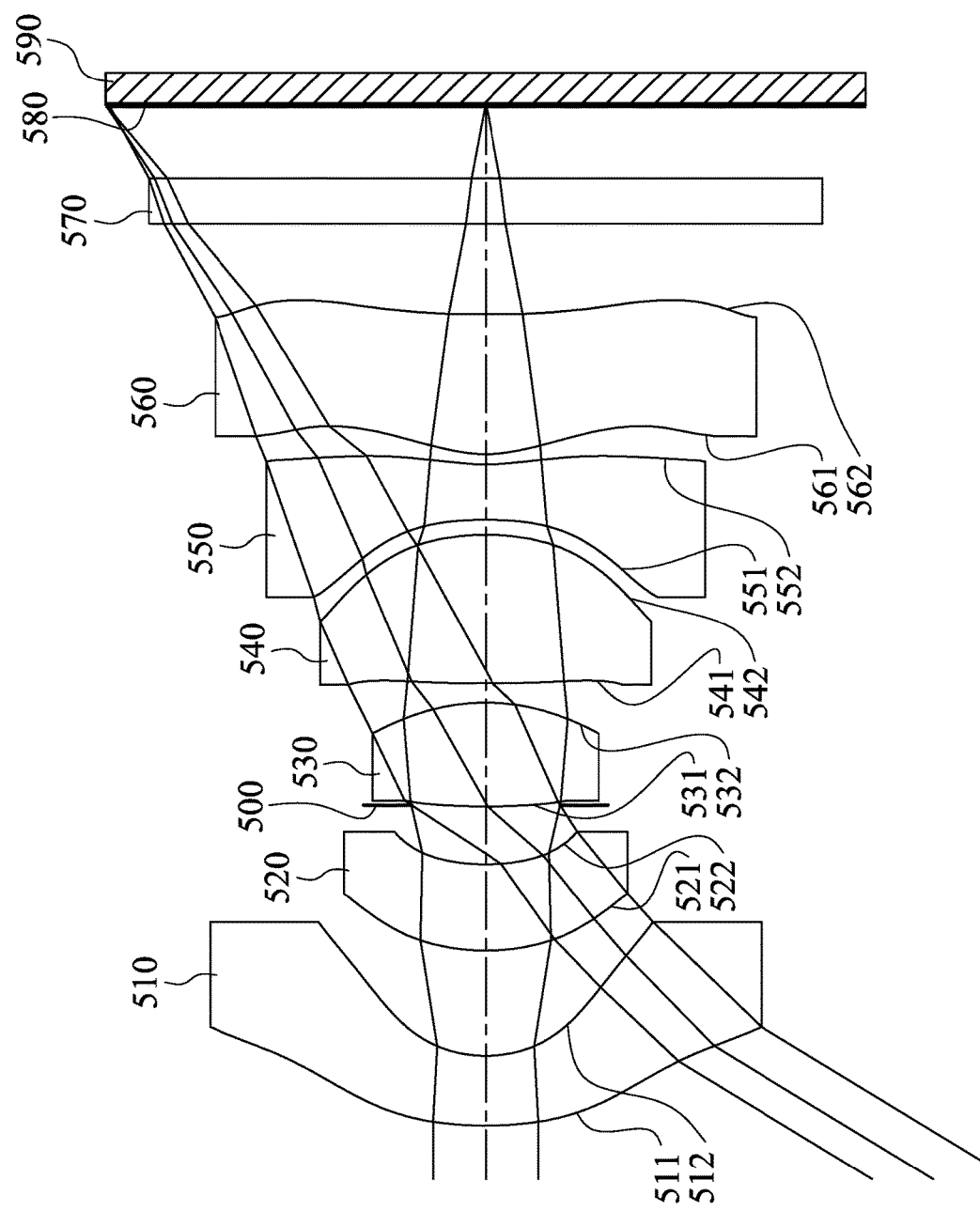
FIG. 9 is a schematic view of an image capturing device according to the 5th embodiment of the present disclosure.
Figure 10:
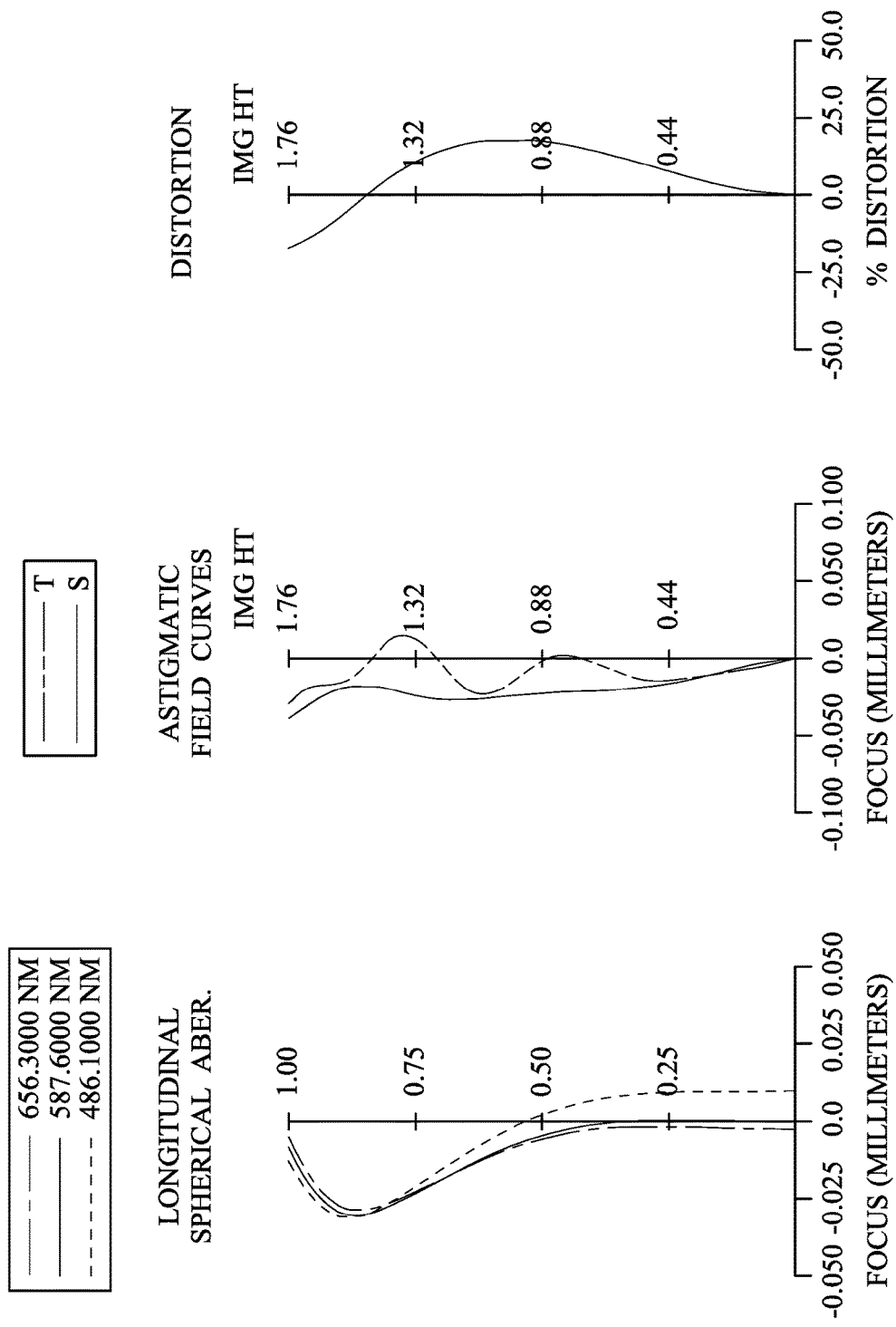
FIG. 10 shows spherical aberration curves, astigmatic field curves and a distortion curve of the image capturing device according to the 5th embodiment.

FIG. 9 is a schematic view of an image capturing device according to the 5th embodiment of the present disclosure. FIG. 10 shows spherical aberration curves, astigmatic field curves and a distortion curve of the image capturing device according to the 5th embodiment. In FIG. 9, the image capturing device includes an optical lens (its reference numeral is omitted) and an image sensor 590. The optical lens includes, in order from an object side to an image side, a first lens element 510, a second lens element 520, an aperture stop 500, a third lens element 530, a fourth lens element 540, a fifth lens element 550, a sixth lens element 560, an IR-cut filter 570 and an image surface 580, wherein the image sensor 590 is disposed on the image surface 580 of the optical lens. The optical lens has a total of sixth lens elements (510-560) with refractive power, and there is an air space between every two lens elements of the first lens element 510, the second lens element 520, the third lens element 530, the fourth lens element 540, the fifth lens element 550 and the sixth lens element 560 that are adjacent to each other.

The first lens element 510 with negative refractive power has an object-side surface 511 being convex in a paraxial region thereof and an image-side surface 512 being concave in a paraxial region thereof. The first lens element 510 is made of plastic material, and has the object-side surface 511 and the image-side surface 512 being both aspheric.

The second lens element 520 with positive refractive power has an object-side surface 521 being convex in a paraxial region thereof and an image-side surface 522 being concave in a paraxial region thereof. The second lens element 520 is made of plastic material, and has the object-side surface 521 and the image-side surface 522 being both aspheric.

The third lens element 530 with positive refractive power has an object-side surface 531 being convex in a paraxial region thereof and an image-side surface 532 being convex in a paraxial region thereof. The third lens element 530 is made of plastic material, and has the object-side surface 531 and the image-side surface 532 being both aspheric.

The fourth lens element 540 with positive refractive power has an object-side surface 541 being convex in a paraxial region thereof, and an image-side surface 542 being convex in a paraxial region thereof and including at least one concave shape in an off-axis region thereof. The fourth lens element 540 is made of plastic material, and has the object-side surface 541 and the image-side surface 542 being both aspheric.

The fifth lens element 550 with negative refractive power has an object-side surface 551 being concave in a paraxial region thereof, and an image-side surface 552 being concave in a paraxial region thereof and including at least one convex shape in an off-axis region thereof. The fifth lens element 550 is made of plastic material, and has the object-side surface 551 and the image-side surface 552 being both aspheric.

The sixth lens element 560 with positive refractive power has an object-side surface 561 being convex in a paraxial region thereof, and an image-side surface 562 being concave in a paraxial region thereof and including at least one convex shape in an off-axis region thereof. The sixth lens element 560 is made of plastic material, and has the object-side surface 561 and the image-side surface 562 being both aspheric.

The IR-cut filter 570 is made of glass material and located between the sixth lens element 560 and the image surface 580, and will not affect a focal length of the optical lens.

The detailed optical data of the 5th embodiment are shown in Table 9 and the aspheric surface data are shown in Table 10 below.

TABLE 9

5th Embodiment
f = 1.30 mm, Fno = 2.67, HFOV = 58.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.023 | ASP | 0.322 | Plastic | 1.544 | 55.9 | −1.79 |
| 2 | | 0.620 | ASP | 0.487 | | | | |
| 3 | Lens 2 | 1.073 | ASP | 0.401 | Plastic | 1.544 | 55.9 | 23.56 |
| 4 | | 1.017 | ASP | 0.275 | | | | |

TABLE 9-continued

5th Embodiment
f = 1.30 mm, Fno = 2.67, HFOV = 58.6 deg.

| Surface # | | Curvature Radius | | Thickness | Material | Index | Abbe # | Focal Length |
|---|---|---|---|---|---|---|---|---|
| 5 | Ape. Stop | Plano | | −0.007 | | | | |
| 6 | Lens 3 | 3.574 | ASP | 0.480 | Plastic | 1.544 | 55.9 | 1.48 |
| 7 | | −0.992 | ASP | 0.090 | | | | |
| 8 | Lens 4 | 9.424 | ASP | 0.689 | Plastic | 1.514 | 56.8 | 2.30 |
| 9 | | −1.317 | ASP | 0.070 | | | | |
| 10 | Lens 5 | −1.747 | ASP | 0.256 | Plastic | 1.633 | 23.4 | −1.03 |
| 11 | | 1.097 | ASP | 0.047 | | | | |
| 12 | Lens 6 | 0.638 | ASP | 0.650 | Plastic | 1.514 | 56.8 | 1.30 |
| 13 | | 8.806 | ASP | 0.419 | | | | |
| 14 | IR-cut filter | Plano | | 0.210 | Glass | 1.517 | 64.2 | — |
| 15 | | Plano | | 0.339 | | | | |
| 16 | Image | Plano | | — | | | | |

Note:
Reference wavelength is 587.6 nm (d-line).

TABLE 10

Aspheric Coefficients

| | Surface # | | | | | |
|---|---|---|---|---|---|---|
| | 1 | 2 | 3 | 4 | 6 | 7 |
| k = | −2.0725E−01 | −7.7056E−01 | −8.9818E−01 | −1.4271E+00 | 1.3871E+01 | −7.4081E+00 |
| A4 = | 5.4356E−01 | 1.0635E+00 | 5.9066E−01 | 1.3894E+00 | 1.5132E−01 | −7.5658E−01 |
| A6 = | −3.7707E−01 | 5.0337E+00 | −1.9431E−01 | −5.0234E−01 | 1.2553E+00 | 9.1358E−01 |
| A8 = | −8.1544E−01 | −3.0709E+01 | −3.2505E+00 | 2.2564E+01 | | −4.5976E+00 |
| A10 = | 1.3551E+00 | 4.8092E+01 | 1.2352E+01 | | | 1.6644E+01 |
| A12 = | −8.4009E−01 | −2.4586E+01 | −1.6255E+01 | | | |
| A14 = | 2.4775E−01 | | | | | |
| A16 = | −2.9100E−02 | | | | | |

| | Surface # | | | | | |
|---|---|---|---|---|---|---|
| | 8 | 9 | 10 | 11 | 12 | 13 |
| k = | −1.0000E+00 | 6.9670E−01 | 3.1445E+00 | −2.6303E+01 | −8.0662E+00 | −9.0000E+01 |
| A4 = | 2.7536E−01 | −1.0297E+00 | −9.8651E−01 | −7.5148E−01 | −1.7347E−01 | 4.3570E−01 |
| A6 = | −1.4776E+00 | 2.1355E+00 | 8.0863E−01 | 1.7909E+00 | −6.3705E−01 | −9.8302E−01 |
| A8 = | 1.7478E+00 | −4.7271E+00 | 1.1921E−01 | −2.5593E+00 | 2.2611E+00 | 9.3570E−01 |
| A10 = | −2.0969E+00 | 1.1722E+01 | 7.5234E−01 | 2.0751E+00 | −3.8900E+00 | −4.9009E−01 |
| A12 = | | −2.0367E+01 | | −6.9997E−01 | 3.2250E+00 | 1.0944E−01 |
| A14 = | | 1.5358E+01 | | | −9.9070E−01 | |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 1.30 | T12/(T34 + T45 + T56) | 2.35 |
| Fno | 2.67 | TL/sin(HFOV × 1.6) [mm] | 4.74 |
| HFOV [deg.] | 58.6 | CT5/|Sag52| | 21.11 |
| tan(HFOV) | 1.64 | R11/f | 0.49 |
| Nmax | 1.633 | |f1|/f2 | 0.08 |
| T12/T23 | 1.82 | f6/f4 | 0.57 |

Furthermore, according to the 5th embodiment, when a central thickness of the first lens element 510 is CT1, a central thickness of the second lens element 520 is CT2, a central thickness of the third lens element 530 is CT3, a central thickness of the fourth lens element 540 is CT4, and a central thickness of the sixth lens element 560 is CT6, the following conditions are satisfied: CT1<CT2; CT1<CT3; CT1<CT4; and CT1<CT6.

According to the 5th embodiment, when the focal length of the first lens element 510 is f1, the focal length of the second lens element 520 is f2, a focal length of the third lens element 530 is f3, the focal length of the fourth lens element 540 is f4, a focal length of the fifth lens element 550 is f5, and the focal length of the sixth lens element 560 is f6, the following conditions are satisfied: |f5|<|f1|; |f5|<|f2|; |f5|<|f3|; |f5|<|f4|; and |f5|<|f6|.

6th Embodiment

Figure 11:
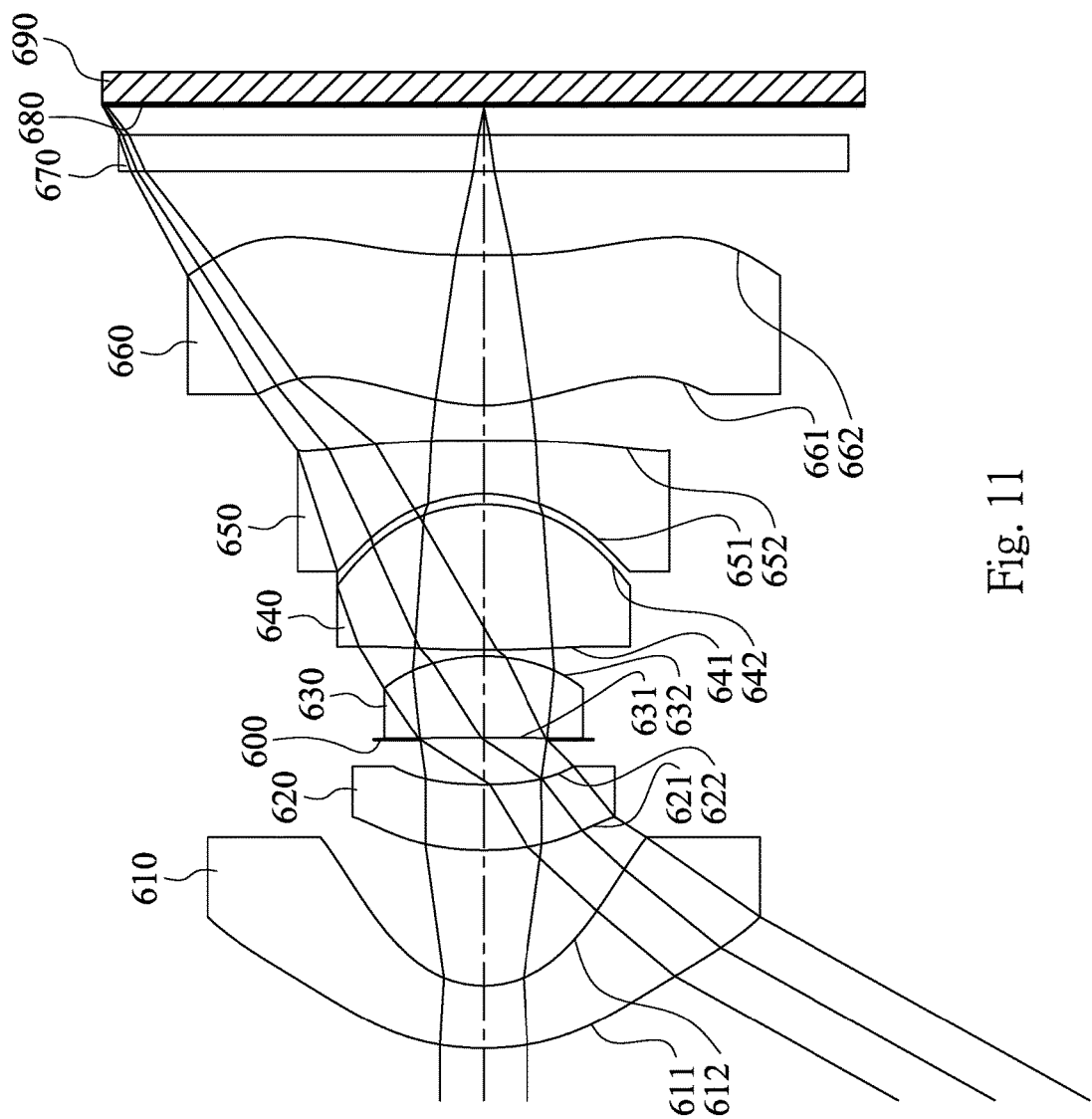
FIG. 11 is a schematic view of an image capturing device according to the 6th embodiment of the present disclosure.
Figure 12:
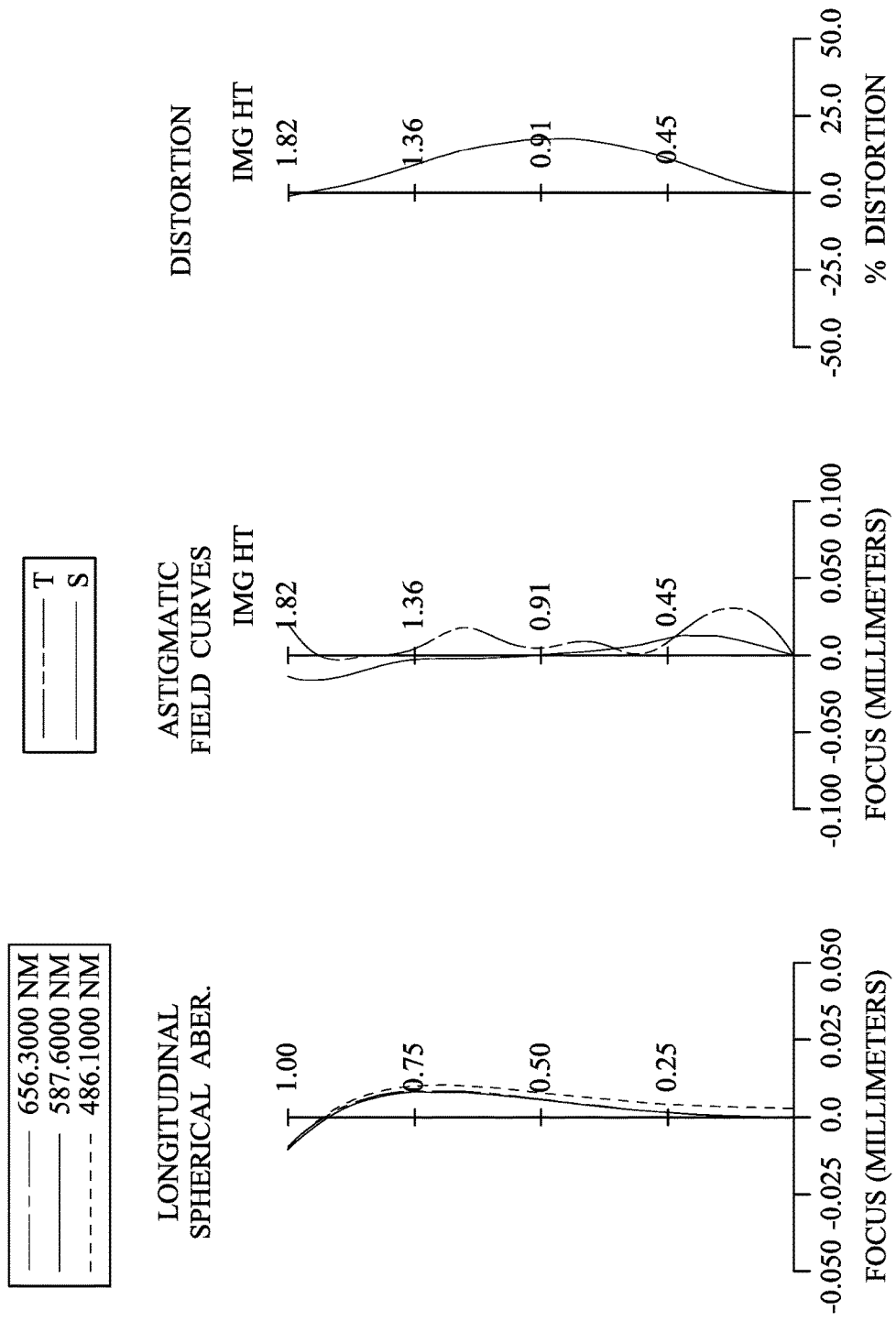
FIG. 12 shows spherical aberration curves, astigmatic field curves and a distortion curve of the image capturing device according to the 6th embodiment.

FIG. 11 is a schematic view of an image capturing device according to the 6th embodiment of the present disclosure. FIG. 12 shows spherical aberration curves, astigmatic field curves and a distortion curve of the image capturing to device according to the 6th embodiment. In FIG. 11, the image capturing device includes an optical lens (its reference numeral is omitted) and an image sensor 690. The optical lens includes, in order from an object side to an image side, a first lens element 610, a second lens element 620, an aperture stop 600, a third lens element 630, a fourth lens element 640, a fifth lens element 650, a sixth lens element 660, an IR-cut filter 670 and an image surface 680, wherein the image sensor 690 is disposed on the image surface 680 of the optical lens. The optical lens has a total of sixth lens elements (610-660) with refractive power, and there is an air space between every two lens elements of the first lens element 610, the second lens element 620, the third lens element 630, the fourth lens element 640, the fifth lens element 650 and the sixth lens element 660 that are adjacent to each other.

The first lens element 610 with negative refractive power has an object-side surface 611 being convex in a paraxial region thereof and an image-side surface 612 being concave in a paraxial region thereof. The first lens element 610 is made of plastic material, and has the object-side surface 611 and the image-side surface 612 being both aspheric.

The second lens element 620 with positive refractive power has an object-side surface 621 being convex in a paraxial region thereof and an image-side surface 622 being concave in a paraxial region thereof. The second lens element 620 is made of plastic material, and has the object-side surface 621 and the image-side surface 622 being both aspheric.

The third lens element 630 with positive refractive power has an object-side surface 631 being concave in a paraxial region thereof and an image-side surface 632 being convex in a paraxial region thereof. The third lens element 630 is made of plastic material, and has the object-side surface 631 and the image-side surface 632 being both aspheric.

The fourth lens element 640 with positive refractive power has an object-side surface 641 being convex in a paraxial region thereof, and an image-side surface 642 being convex in a paraxial region thereof and including at least one concave shape in an off-axis region thereof. The fourth lens element 640 is made of plastic material, and has the object-side surface 641 and the image-side surface 642 being both aspheric.

The fifth lens element 650 with negative refractive power has an object-side surface 651 being concave in a paraxial region thereof, and an image-side surface 652 being concave in a paraxial region thereof and including at least one convex shape in an off-axis region thereof. The fifth lens element 650 is made of plastic material, and has the object-side surface 651 and the image-side surface 652 being both aspheric.

The sixth lens element 660 with positive refractive power has an object-side surface 661 being convex in a paraxial region thereof, and an image-side surface 662 being concave in a paraxial region thereof and including at least one convex shape in an off-axis region thereof. The sixth lens element 660 is made of plastic material, and has the object-side surface 661 and the image-side surface 662 being both aspheric.

The IR-cut filter 670 is made of glass material and located between the sixth lens element 660 and the image surface 680, and will not affect a focal length of the optical lens.

The detailed optical data of the 6th embodiment are shown in Table 11 and the aspheric surface data are shown in Table 12 below.

TABLE 11

6th Embodiment
f = 1.02 mm, Fno = 2.45, HFOV = 60.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.401 ASP | 0.299 | Plastic | 1.544 | 55.9 | −1.68 |
| 2 | | 0.511 ASP | 0.646 | | | | |
| 3 | Lens 2 | 1.392 ASP | 0.313 | Plastic | 1.639 | 23.5 | 8.35 |
| 4 | | 1.718 ASP | 0.215 | | | | |
| 5 | Ape. Stop | Plano | 0.009 | | | | |
| 6 | Lens 3 | −27.171 ASP | 0.391 | Plastic | 1.544 | 55.9 | 1.72 |
| 7 | | −0.910 ASP | 0.030 | | | | |
| 8 | Lens 4 | 6.707 ASP | 0.694 | Plastic | 1.544 | 55.9 | 1.35 |
| 9 | | −0.793 ASP | 0.050 | | | | |
| 10 | Lens 5 | −0.732 ASP | 0.255 | Plastic | 1.639 | 23.5 | −1.12 |
| 11 | | 31.702 ASP | 0.169 | | | | |
| 12 | Lens 6 | 0.892 ASP | 0.716 | Plastic | 1.544 | 55.9 | 1.75 |
| 13 | | 9.800 ASP | 0.400 | | | | |
| 14 | IR-cut filter | Plano | 0.175 | Glass | 1.517 | 64.2 | — |
| 15 | | Plano | 0.144 | | | | |
| 16 | Image | Plano | — | | | | |

Note:
Reference wavelength is 587.6 nm (d-line).

TABLE 12

Aspheric Coefficients

| Surface # | | | | | |
|---|---|---|---|---|---|
| 1 | 2 | 3 | 4 | 6 | 7 |
| k = −7.2280E−01 | −8.2265E−01 | 1.0556E+00 | −1.6190E−01 | −1.6902E+00 | −3.7511E+00 |
| A4 = 4.5660E−01 | 1.2387E+00 | 2.6898E−01 | 7.2144E−01 | −8.1192E−02 | −8.0299E−01 |

TABLE 12-continued

| Aspheric Coefficients | | | | | |
|---|---|---|---|---|---|
| A6 = | −8.9294E−01 | −1.8232E+00 | −7.0173E−01 | 1.1657E+00 | −1.0288E+00 | 8.1596E−01 |
| A8 = | 6.6692E−01 | −1.8477E+00 | 4.1425E+00 | | | −9.7803E+00 |
| A10 = | −2.3791E−01 | 5.1098E+00 | −1.4525E+01 | | | 1.6998E+01 |
| A12 = | 3.4841E−02 | −3.6346E+00 | 1.0261E+01 | | | |

| Surface # | | | | | |
|---|---|---|---|---|---|
| | 8 | 9 | 10 | 11 | 12 | 13 |
| k = | 2.8629E+01 | −2.0402E−01 | −3.7018E−01 | −4.6244E+01 | −9.0434E+00 | 2.5798E+01 |
| A4 = | 9.2036E−03 | 3.4702E−01 | 4.9769E−01 | −8.4049E−01 | 1.3285E−01 | 6.5205E−01 |
| A6 = | 1.9368E−01 | −4.1459E+00 | −2.4155E+00 | 3.7007E+00 | −1.2879E+00 | −1.7680E+00 |
| A8 = | −3.1301E+00 | 1.5437E+01 | 3.4205E+00 | −9.3997E+00 | 2.8636E+00 | 2.3002E+00 |
| A10 = | 4.8334E+00 | −2.7104E+01 | | 1.3466E+01 | −3.4864E+00 | −1.7911E+00 |
| A12 = | | 1.9704E+01 | | −1.0021E+01 | 2.0658E+00 | 8.0827E−01 |
| A14 = | | | | 3.0873E+00 | −4.5765E−01 | −1.9367E−01 |
| A16 = | | | | | | 1.9083E−02 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 1.02 | T12/(T34 + T45 + T56) | 2.59 |
| Fno | 2.45 | TL/sin(HFOV × 1.6) [mm] | 4.54 |
| HFOV [deg.] | 60.8 | CT5/|Sag52| | 5.26 |
| tan(HFOV) | 1.79 | R11/f | 0.87 |
| Nmax | 1.639 | |f1|/f2 | 0.20 |
| T12/T23 | 2.88 | f6/f4 | 1.30 |

Furthermore, according to the 6th embodiment, when a central thickness of the first lens element 610 is CT1, a central thickness of the second lens element 620 is CT2, a central thickness of the third lens element 630 is CT3, a central thickness of the fourth lens element 640 is CT4, and a central thickness of the sixth lens element 660 is CT6, the following conditions are satisfied: CT1<CT2; CT1<CT3; CT1<CT4; and CT1<CT6.

According to the 6th embodiment, when the focal length of the first lens element 610 is f1, the focal length of the second lens element 620 is f2, a focal length of the third lens element 630 is f3, the focal length of the fourth lens element 640 is f4, a focal length of the fifth lens element 650 is f5, and the focal length of the sixth lens element 660 is f6, the following conditions are satisfied: |f5|<|f1|; |f5|<|f2|; |f5|<|f3|; |f5|<|f4|; and |f5|<|f6|.

7th Embodiment

Figure 13:
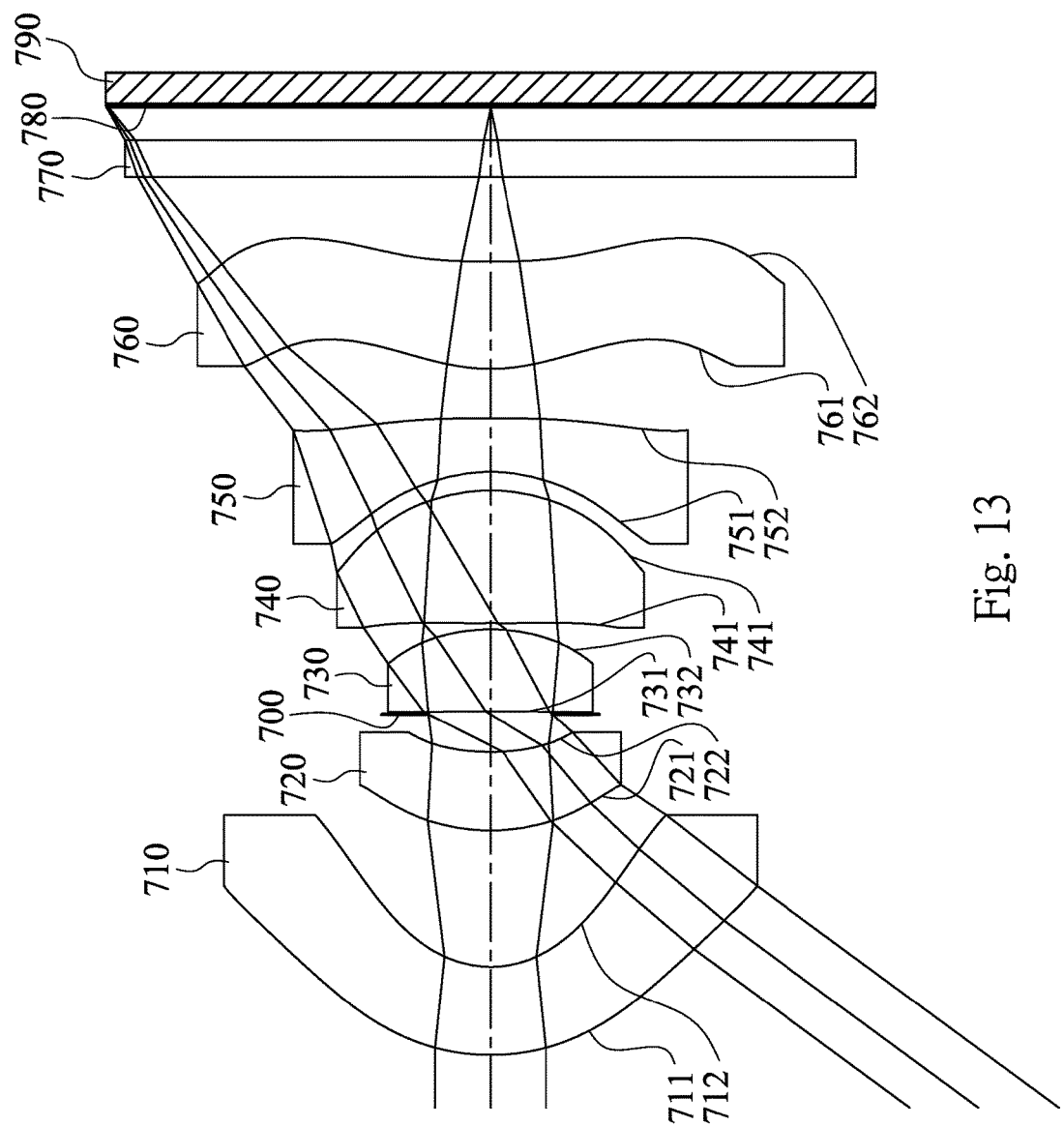
FIG. 13 is a schematic view of an image capturing device according to the 7th embodiment of the present disclosure.
Figure 14:
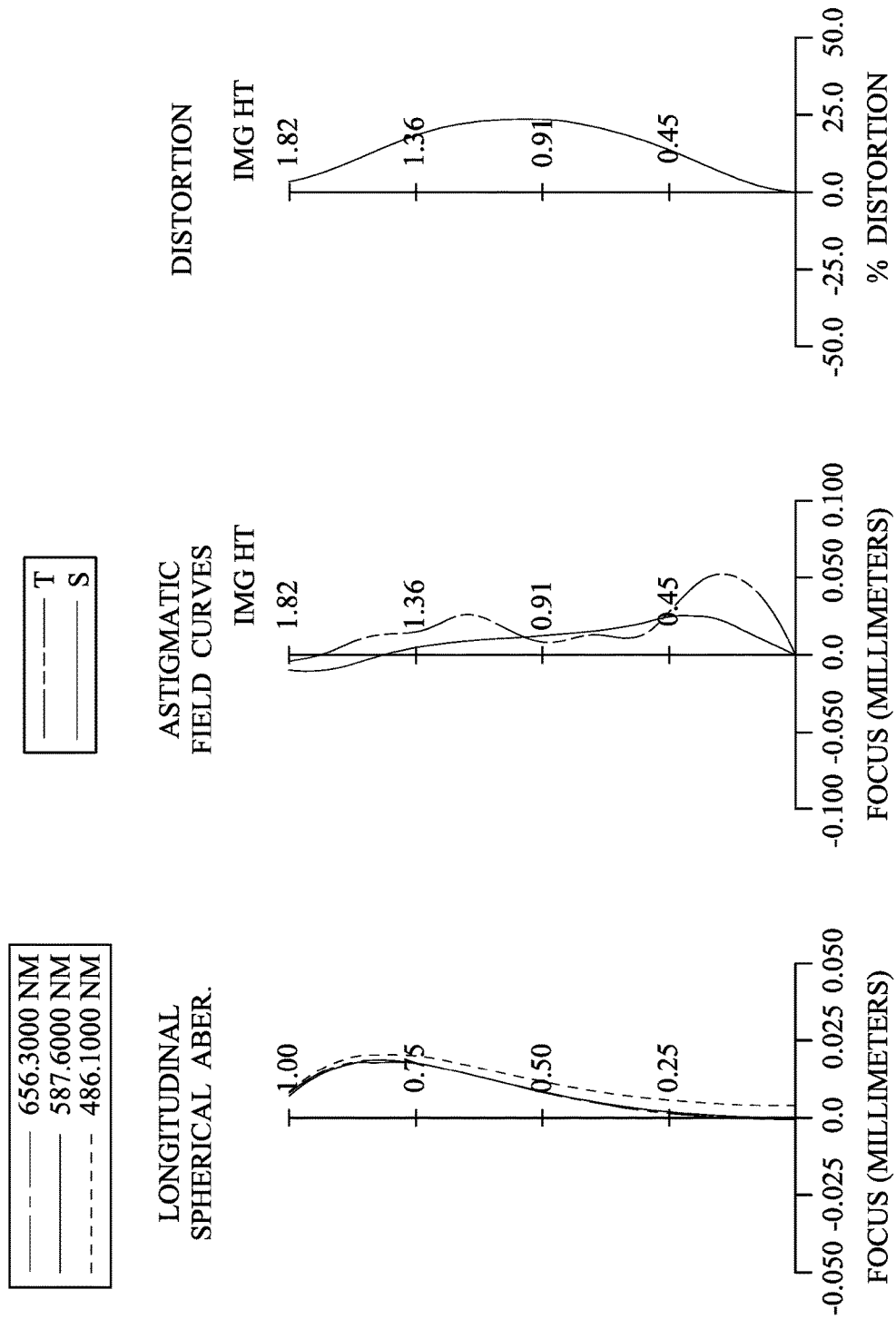
FIG. 14 shows spherical aberration curves, astigmatic field curves and a distortion curve of the image capturing device according to the 7th embodiment.

FIG. 13 is a schematic view of an image capturing device according to the 7th embodiment of the present disclosure. FIG. 14 shows spherical aberration curves, astigmatic field curves and a distortion curve of the image capturing device according to the 7th embodiment. In FIG. 13, the image capturing device includes an optical lens (its reference numeral is omitted) and an image sensor 790. The optical lens includes, in order from an object side to an image side, a first lens element 710, a second lens element 720, an aperture stop 700, a third lens element 730, a fourth lens element 740, a fifth lens element 750, a sixth lens element 760, an IR-cut filter 770 and an image surface 780, wherein the image sensor 790 is disposed on the image surface 780 of the optical lens. The optical lens has a total of sixth lens elements (710-760) with refractive power, and there is an air space between every two lens elements of the first lens element 710, the second lens element 720, the third lens element 730, the fourth lens element 740, the fifth lens element 750 and the sixth lens element 760 that are adjacent to each other.

The first lens element 710 with negative refractive power has an object-side surface 711 being convex in a paraxial region thereof and an image-side surface 712 being concave in a paraxial region thereof. The first lens element 710 is made of plastic material, and has the object-side surface 711 and the image-side surface 712 being both aspheric.

The second lens element 720 with positive refractive power has an object-side surface 721 being convex in a paraxial region thereof and an image-side surface 722 being concave in a paraxial region thereof. The second lens element 720 is made of plastic material, and has the object-side surface 721 and the image-side surface 722 being both aspheric.

The third lens element 730 with positive refractive power has an object-side surface 731 being concave in a paraxial region thereof and an image-side surface 732 being convex in a paraxial region thereof. The third lens element 730 is made of plastic material, and has the object-side surface 731 and the image-side surface 732 being both aspheric.

The fourth lens element 740 with positive refractive power has an object-side surface 741 being convex in a paraxial region thereof, and an image-side surface 742 being convex in a paraxial region thereof and including at least one concave shape in an off-axis region thereof. The fourth lens element 740 is made of plastic material, and has the object-side surface 741 and the image-side surface 742 being both aspheric.

The fifth lens element 750 with negative refractive power has an object-side surface 751 being concave in a paraxial region thereof, and an image-side surface 752 being concave in a paraxial region thereof and including at least one convex shape in an off-axis region thereof. The fifth lens element 750 is made of plastic material, and has the object-side surface 751 and the image-side surface 752 being both aspheric.

The sixth lens element 760 with positive refractive power has an object-side surface 761 being convex in a paraxial region thereof, and an image-side surface 762 being concave in a paraxial region thereof and including at least one convex shape in an off-axis region thereof. The sixth lens element 760 is made of plastic material, and has the object-side surface 761 and the image-side surface 762 being both aspheric.

The IR-cut filter 770 is made of glass material and located between the sixth lens element 760 and the image surface 780, and will not affect a focal length of the optical lens.

The detailed optical data of the 7th embodiment are shown in Table 13 and the aspheric surface data are shown in Table 14 below.

TABLE 13

7th Embodiment
f = 1.29 mm, Fno = 2.45, HFOV = 53.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.053 ASP | 0.419 | Plastic | 1.639 | 23.5 | −2.35 |
| 2 | | 0.523 ASP | 0.645 | | | | |
| 3 | Lens 2 | 0.954 ASP | 0.372 | Plastic | 1.639 | 23.5 | 5.76 |
| 4 | | 1.092 ASP | 0.179 | | | | |
| 5 | Ape. Stop | Plano | 0.015 | | | | |
| 6 | Lens 3 | −24.558 ASP | 0.388 | Plastic | 1.544 | 55.9 | 1.72 |
| 7 | | −0.906 ASP | 0.030 | | | | |
| 8 | Lens 4 | 64.598 ASP | 0.627 | Plastic | 1.544 | 55.9 | 1.52 |
| 9 | | −0.836 ASP | 0.088 | | | | |
| 10 | Lens 5 | −0.800 ASP | 0.255 | Plastic | 1.639 | 23.5 | −1.23 |
| 11 | | 64.792 ASP | 0.234 | | | | |
| 12 | Lens 6 | 0.866 ASP | 0.508 | Plastic | 1.544 | 55.9 | 1.76 |
| 13 | | 6.981 ASP | 0.400 | | | | |
| 14 | IR-cut filter | Plano | 0.175 | Glass | 1.517 | 64.2 | — |
| 15 | | Plano | 0.165 | | | | |
| 16 | Image | Plano | — | | | | |

Note:
Reference wavelength is 587.6 nm (d-line).

TABLE 14

Aspheric Coefficients

| | Surface # | | | | | |
|---|---|---|---|---|---|---|
| | 1 | 2 | 3 | 4 | 6 | 7 |
| k = | −7.9961E−01 | −9.2372E−01 | −4.6981E−01 | −2.0572E+00 | 9.0000E+01 | −3.0190E+00 |
| A4 = | 2.6704E−01 | 1.0873E+00 | 1.8226E−01 | 7.4636E−01 | −1.9195E−01 | −8.2824E−01 |
| A6 = | −3.2493E−01 | −2.7674E+00 | −3.2860E−01 | 2.9591E+00 | 4.1991E−01 | 1.7562E+00 |
| A8 = | 1.0129E−01 | 4.0804E+00 | 1.8865E+00 | −9.2903E+00 | −8.4388E+00 | −1.5303E+01 |
| A10 = | −3.8568E−03 | −4.7303E+00 | −2.4587E+00 | 6.0727E+01 | 6.1832E+01 | 2.9506E+01 |
| A12 = | 2.4739E−04 | 2.1348E+00 | −8.2400E+00 | 4.6348E−11 | 5.9171E−10 | 1.0882E−09 |

| | Surface # | | | | | |
|---|---|---|---|---|---|---|
| | 8 | 9 | 10 | 11 | 12 | 13 |
| k = | −9.0000E+01 | −2.0058E−01 | −1.6410E−01 | −1.0507E+01 | −8.7735E+00 | 4.1138E+00 |
| A4 = | −8.8337E−02 | 5.8338E−01 | 6.6686E−01 | −9.5887E−01 | 3.3671E−01 | 1.0091E+00 |
| A6 = | 7.7324E−01 | −4.6822E+00 | −2.4441E+00 | 3.8936E+00 | −2.0298E+00 | −2.9874E+00 |
| A8 = | −5.8411E+00 | 1.5718E+01 | 3.9527E+00 | −9.1121E+00 | 3.6087E+00 | 4.2223E+00 |
| A10 = | 8.1400E+00 | −2.7369E+01 | −7.9834E−01 | 1.2486E+01 | −3.4418E+00 | −3.5670E+00 |
| A12 = | −4.1564E−09 | 1.9704E+01 | −1.2242E−08 | −8.9961E+00 | 1.6617E+00 | 1.7981E+00 |
| A14 = | | | | 2.6433E+00 | −3.1052E−01 | −5.0383E−01 |
| A16 = | | | | | | 6.0912E−02 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 1.29 | T12/(T34 + T45 + T56) | 1.83 |
| Fno | 2.45 | TL/sin(HFOV × 1.6) [mm] | 4.51 |
| HFOV [deg.] | 53.6 | CT5/|Sag52| | 4.57 |

-continued

| 7th Embodiment | | | |
|---|---|---|---|
| tan(HFOV) | 1.36 | R11/f | 0.67 |
| Nmax | 1.639 | |f1|/f2 | 0.41 |
| T12/T23 | 3.32 | f6/f4 | 1.16 |

Furthermore, according to the 7th embodiment, when the focal length of the first lens element 710 is f1, the focal length of the second lens element 720 is f2, a focal length of the third lens element 730 is f3, the focal length of the fourth lens element 740 is f4, a focal length of the fifth lens element 750 is f5, and the focal length of the sixth lens element 760 is f6, the following conditions are satisfied: |f5|<|f1|; |f5|<|f2|; |f5|<|f3|; |f5|<|f4|; and |f5|<|f6|.

8th Embodiment

Figure 16:
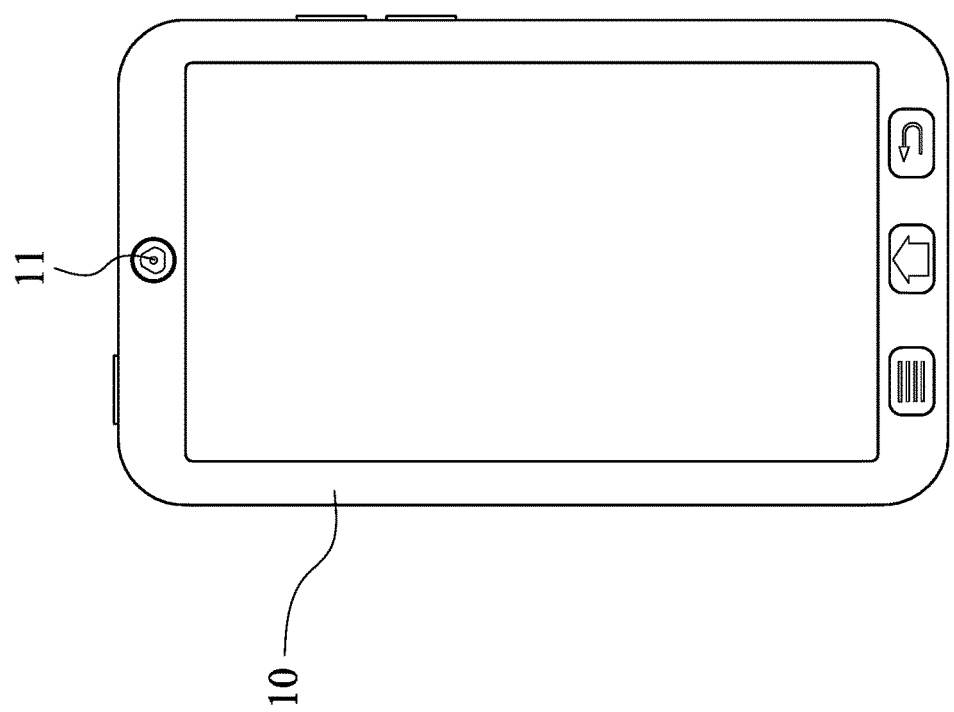
FIG. 16 is a schematic view of an electronic device according to the 8th embodiment of the present disclosure.

FIG. 16 is a schematic view of an electronic device 10 according to the 8th embodiment of the present disclosure. The electronic device 10 of the 8th embodiment is a smart phone, wherein the electronic device 10 includes an image capturing device 11. The image capturing device 11 includes an optical lens (its reference numeral is omitted) according to the present disclosure and an image sensor (its reference numeral is omitted), wherein the image sensor is disposed on an image surface of the optical lens.

9th Embodiment

Figure 17:
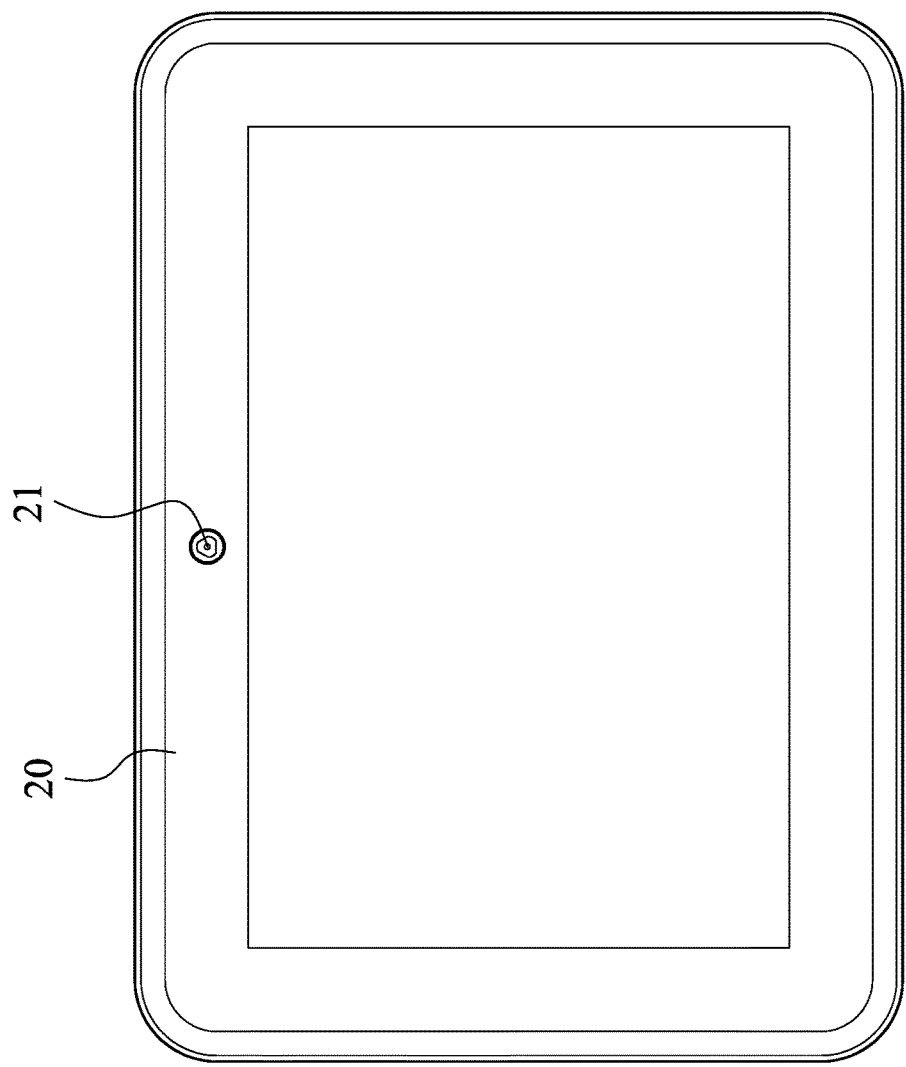
FIG. 17 is a schematic view of an electronic device according to the 9th embodiment of the present disclosure.

FIG. 17 is a schematic view of an electronic device 20 according to the 9th embodiment of the present disclosure. The electronic device 20 of the 9th embodiment is a tablet personal computer, wherein the electronic device 20 includes an image capturing device 21. The image capturing device 21 includes an optical lens (its reference numeral is omitted) according to the present disclosure and an image sensor (Its reference numeral is omitted), wherein the image sensor is disposed on an image surface of the optical lens.

10th Embodiment

Figure 18:
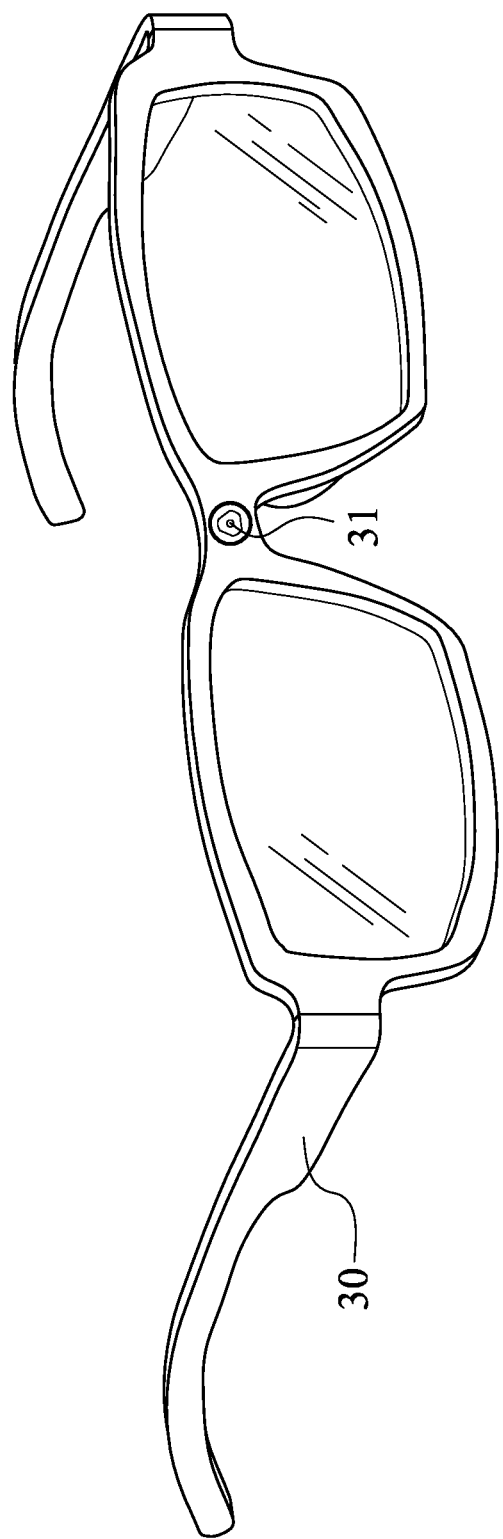
FIG. 18 is a schematic view of an electronic device according to the 10th embodiment of the present disclosure.

FIG. 18 is a schematic view of an electronic device 30 according to the 10th embodiment of the present disclosure. The electronic device 30 of the 10th embodiment is a wearable device, such as a head-mounted display (HMD), wherein the electronic device 30 includes an image capturing device 31. The image capturing device 31 includes an optical lens (its reference numeral is omitted) according to the present disclosure and an image sensor (its reference numeral is omitted), wherein the image sensor is disposed on an image surface of the optical lens.

The foregoing description, for purpose of explanation, has been described with reference to specific embodiments. It is to be noted that TABLES 1-14 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical lens comprising, in order from an object side to an image side:
a first lens element with negative refractive power having an image-side surface being concave in a paraxial region thereof;
a second lens element with positive refractive power having an object-side surface being convex in a paraxial region thereof;
a third lens element with positive refractive power having an object-side surface being convex in a paraxial region thereof;
a fourth lens element having positive refractive power;
a fifth lens element having negative refractive power; and
a sixth lens element with positive refractive power having an object-side surface being convex in a paraxial region thereof and an image-side surface being concave in a paraxial region thereof, the image-side surface of the sixth lens element comprising at least one convex shape in an off-axis region thereof, and the object-side surface and the image-side surface of the sixth lens element being aspheric;
wherein the optical lens has a total of six lens elements, an axial distance between the first lens element and the second lens element is T12, an axial distance between the second lens element and the third lens element is T23, and the following condition is satisfied:

$1.40 < T12/T23.$

2. The optical lens of claim 1, wherein an absolute value of a curvature radius of the object-side surface of the third lens element is greater than an absolute value of a curvature radius of an image-side surface the of third lens element.

3. The optical lens of claim 1, wherein an absolute value of a curvature radius of an object-side surface of the fifth lens element is greater than an absolute value of a curvature radius of an image-side surface the of fifth lens element.

4. The optical lens of claim 1, wherein the fourth lens element is a meniscus lens element.

5. The optical lens of claim 1, wherein a central thickness of the first lens element is CT1, a central thickness of the second lens element is CT2, and the following condition is satisfied:

$CT1 < CT2.$

6. The optical lens of claim 1, wherein a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, and the following conditions are satisfied:

$|f5| < |f1|$ $|f5| < |f2|;$ $|f5| < |f3|;$ $|f5| < |f4|;$ and $|f5| < |f6|.$

7. The optical lens of claim 1, wherein a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a maximum of N1, N2, N3, N4, N5 and N6 is Nmax, and the following condition is satisfied:

$1.60 < Nmax < 1.70.$

8. The optical lens of claim 1, wherein a focal length of the optical lens is f, a curvature radius of the object-side surface of the sixth lens element is R11, and the following condition is satisfied:

$$0<R11/f<1.40.$$

9. The optical lens of claim 1, wherein a half of the maximal field of view of the optical lens is HFOV, and the following condition is satisfied:

$$1.30<\tan(HFOV).$$

10. The optical lens of claim 1, wherein there is an air space between every two lens elements of the first lens element, the second lens element, the third lens element, the fourth lens element, the fifth lens element and the sixth lens element that are adjacent to each other.

11. The optical lens of claim 1, wherein a focal length of the first lens element is f1, a focal length of the second lens element is f2, and the following condition is satisfied:

$$0.10 \le |f1|/f2<4.0.$$

12. The optical lens of claim 1, wherein the axial distance between the first lens element and the second lens element is T12, an axial distance between the third lens element and the fourth lens element is T34, an axial distance between the fourth lens element and the fifth lens element is T45, an axial distance between the fifth lens element and the sixth lens element is T56, and the following condition is satisfied:

$$1.25<T12/(T34+T45+T56)<4.0.$$

13. The optical lens of claim 1, wherein a half of the maximal field of view of the optical lens is HFOV, an axial distance between an object-side surface of the first lens element and an image surface is TL, and the following condition is satisfied:

$$TL/\sin(HFOV \times 1.6)<7.0 \text{ mm}.$$

14. The optical lens of claim 1, wherein an object-side surface of the fourth lens element comprises at least one concave shape in an off-axis region thereof.

15. The optical lens of claim 1, wherein a central thickness of the fourth lens element is greater than a central thickness of the third lens element.

16. The optical lens of claim 1, wherein a central thickness of the fifth lens element is greater than an axial distance between the fifth lens element and the sixth lens element.

17. An image capturing device, comprising:
the optical lens of claim 1; and
an image sensor, wherein the image sensor is disposed on an image surface of the optical lens.

18. An electronic device, comprising:
the image capturing device of claim 17.

\* \* \* \* \*